US010358729B2

United States Patent
Doyen et al.

(10) Patent No.: US 10,358,729 B2
(45) Date of Patent: Jul. 23, 2019

(54) SEPARATOR, AN ELECTROCHEMICAL CELL THEREWITH AND USE THEREOF THEREIN

(71) Applicant: VITO NV, Mol (BE)

(72) Inventors: Willy Doyen, Wommelgem (BE); Yolanda Alvarez Gallego, Antwerp (BE)

(73) Assignee: VITO NV, Mol (BE)

( * ) Notice: Subject to any disclaimer, the term of this patent is extended or adjusted under 35 U.S.C. 154(b) by 274 days.

(21) Appl. No.: 13/975,819

(22) Filed: Aug. 26, 2013

(65) Prior Publication Data

US 2013/0337368 A1   Dec. 19, 2013

Related U.S. Application Data

(63) Continuation-in-part of application No. PCT/EP2012/053376, filed on Feb. 28, 2012.
(Continued)

(30) Foreign Application Priority Data

Feb. 28, 2011   (EP) .................................... 11156178

(51) Int. Cl.
C25B 13/02 (2006.01)
C25B 1/12 (2006.01)
(Continued)

(52) U.S. Cl.
CPC ................. *C25B 13/02* (2013.01); *C08J 5/22* (2013.01); *C25B 1/12* (2013.01); *C25B 13/04* (2013.01);
(Continued)

(58) Field of Classification Search
None
See application file for complete search history.

(56) References Cited

U.S. PATENT DOCUMENTS 4,233,146 A * 11/1980 Rothmayer ............ B01D 61/30
                                                                  204/255
5,098,532 A     3/1992 Thompson et al.
(Continued)

FOREIGN PATENT DOCUMENTS

GB        781287        8/1957
JP       H07233267      9/1995
(Continued)

OTHER PUBLICATIONS

Mues et al. (WO 2009147084) (a raw machine translation) (Abstract and Detailed Desription) (Dec. 10, 2009).*
(Continued)

*Primary Examiner* — Carmen V Lyles-Irving
(74) *Attorney, Agent, or Firm* — Knobbe Martens Olson & Bear LLP

(57) ABSTRACT

An ion-permeable web-reinforced separator, said ion-permeable web-reinforced separator comprising two separator elements separated by an (optionally integrated) substantially hollow by-pass channel, wherein the separator elements each comprise a binder and a metal oxide or hydroxide dispersed therein and the separator elements have a bubble point of at least 1 bar (0.1 MPa) and a back-wash resistance of at least 1 bar (0.1 MPa) and optionally have a specific resistance less than 4 Ω-cm at 30° C. in 6M potassium hydroxide solution; an electrochemical cell involving the production or consumption of at least one gas, said electrochemical cell comprising said ion-permeable
(Continued)

web-reinforced separator; and the use thereof in an electrochemical cell involving the production or consumption of at least one gas.

25 Claims, 10 Drawing Sheets

Related U.S. Application Data

(60) Provisional application No. 61/447,145, filed on Feb. 28, 2011.

(51) Int. Cl.
| | | |
|---|---|---|
| C25B 13/04 | (2006.01) | |
| H01M 8/0215 | (2016.01) | |
| H01M 8/0243 | (2016.01) | |
| H01M 8/0252 | (2016.01) | |
| C08J 5/22 | (2006.01) | |
| H01M 8/08 | (2016.01) | |
| H01M 8/083 | (2016.01) | |

(52) U.S. Cl.
CPC ....... *H01M 8/0215* (2013.01); *H01M 8/0243* (2013.01); *H01M 8/0252* (2013.01); *H01M 8/08* (2013.01); *H01M 8/083* (2013.01); *Y02E 60/366* (2013.01); *Y02P 70/56* (2015.11)

(56) References Cited

U.S. PATENT DOCUMENTS

| | | | | |
|---|---|---|---|---|
| 5,156,780 A * | 10/1992 | Kenigsberg | ........ | B01D 67/0088 210/500.21 |
| 5,168,005 A | 12/1992 | Keating et al. | | |
| 5,372,691 A * | 12/1994 | Kao | ................... | H01M 2/1083 204/265 |
| 6,099,987 A * | 8/2000 | Daniel-Ivad | ............ | H01M 2/18 429/129 |
| 6,187,155 B1 * | 2/2001 | Stuart | ...................... | C25B 9/20 204/254 |
| 8,062,500 B2 * | 11/2011 | Sumita | ................... | A61L 2/035 205/242 |
| 2004/0135274 A1 * | 7/2004 | Matsuda | ............ | B01D 67/0011 264/28 |
| 2005/0084737 A1 * | 4/2005 | Wine | ................ | H01M 8/04186 429/447 |
| 2008/0164208 A1 * | 7/2008 | Doyen | ................. | B01D 63/081 210/650 |
| 2009/0233167 A1 * | 9/2009 | Zheng | .................... | H01M 2/22 429/178 |
| 2009/0269675 A1 * | 10/2009 | Huang | .................. | H01M 6/164 429/335 |
| 2010/0183950 A1 * | 7/2010 | Dai | .......................... | H01B 1/24 429/513 |
| 2011/0171377 A1 * | 7/2011 | Mues | ................. | B01D 67/0011 427/180 |

FOREIGN PATENT DOCUMENTS

| | | |
|---|---|---|
| JP | 2000210671 | 8/2000 |
| JP | 20100236044 | 10/2010 |
| WO | 2008147084 | 12/2008 |
| WO | 2009/147086 | 12/2009 |

OTHER PUBLICATIONS www.avcarb.com (How Fuel Cells Work) (Dec. 2013).*
Zawodzinski et al., "The Water Content Dependence of Electro-Osmotic Drag in Proton-Conducting Polymer Electrolytes", Electrochimica Acta, vol. 40, No. 3, pp. 297-302, 1995.*

* cited by examiner

SEPARATOR, AN ELECTROCHEMICAL CELL THEREWITH AND USE THEREOF THEREIN

CROSS REFERENCE TO PRIOR APPLICATIONS

This application is a Continuation-In-Part of International Application No. PCT/EP2012/053376, filed Feb. 28, 2012, which claims priority to European Patent Application No. 11156178.3 filed Feb. 28, 2011, and U.S. Provisional Application No. 61/447,145, filed Feb. 28, 2011, the entire contents of which are incorporated herein by reference.

TECHNICAL FIELD OF THE INVENTION

The present invention relates to a novel separator and an electrochemical cell, for example a high pressure alkaline water electrolysis cell, and an air fuel cell comprising the novel separator.

BACKGROUND OF THE INVENTION

Hydrogen is the only energy source with zero carbon dioxide emission. Electrical energy produced from wind, sun and wave power can be converted into hydrogen by the electrolysis of water and the hydrogen produced can be used to generate energy either in proton exchange membrane fuel cells (PEMFC's) or by combustion with the only by-product being water. However, the generation of hydrogen in electrolysers requires an energy input of at least 3.9 kWh/Nm$^3$ [14.04 MJ/Nm$^3$] and then further energy is required to provide hydrogen at a pressure of up to 800 bar [80 MPa]. Moreover, the energy input required can also vary if the power supply fluctuates in level. Prior art alkali water electrolysis cells have a too limited operational range (20 to 100% of the nominal capacity) and cannot provide hydrogen at high pressures, an expensive compression step being always necessary. Electrolysis performed at pressures up to 50 bar (5.0 MPa) provides hydrogen and oxygen typically having a purity of 99.9 mol % and 99.5 mol % respectively. If electrolysis is performed at higher pressures, the solubility of hydrogen and oxygen in the electrolyte, which increases with increasing pressure, results in gases being produced with a reduced purity, the oxygen produced having a lower purity than the hydrogen due to the more strongly increased diffusion of hydrogen to the oxygen side than vice versa. This results in electrolysis having to be performed at a maximum pressure of 32-50 bar (3.2-5.0 MPa), since, although the upper explosion limit (UEL) for hydrogen-oxygen mixtures at room temperature only changes from 95.2 to 95.1 mol % hydrogen from atmospheric pressure to 200 atmospheres, the lower explosion limit (LEL) increases from 4.0 mol % hydrogen at atmospheric pressure to 5.9 mol % hydrogen at 200 bar (20 MPa).

U.S. Pat. No. 2,683,116 discloses the operation of an electrolytic apparatus having a plurality of pressure-resistant cells each containing an individual diaphragm which subdivides its associated cell into an anode and a cathode chamber and having two gas collecting systems, one for the gas spaces of all anode chambers and the other for the gas spaces of all cathode chambers, the method of starting the operation of such apparatus which consists of the following steps, namely (1) filling all gas spaces of both of said collecting systems with nitrogen at an equal pressure of at least two atmospheres abs (0.2 MPa); and (2) thereafter switching on the current to commence electrolysis.

WO 2004/076721A2 discloses a method of electrolyzing water to generate pressurized hydrogen and oxygen therefrom utilizing an electrolyzer comprising one or more electrolyzer cells, the cells individually comprising (i) a cathode of tubular configuration within which a rod-shaped anode is disposed to define an annular-shaped electrolyte chamber between the cathode and the anode, (ii) a separation membrane of tubular configuration disposed within the electrolyte chamber between the cathode and the anode to divide the electrolyte chamber into an anode sub-chamber and a cathode sub-chamber and seal the sub-chambers against gas flow therebetween, the method comprising the steps of (a) introducing an aqueous solution of electrolyte into both sub-chambers of the electrolyte chamber; (b) applying a DC voltage drop across the respective anodes and cathodes of the cells to dissociate water into hydrogen at the cathode and into oxygen at the anode; and (c) separately withdrawing hydrogen and oxygen from the one or more electrolyzer cells preferably further comprising a pressure vessel and generating hydrogen and oxygen at elevated pressure, which elevated pressure is at least 10 psig [0.689 MPa] and particularly preferably including maintaining the pressure differential between the hydrogen and oxygen withdrawn from the cells at not more than about 0.25 psig [17.2 kPa]. This technique is applied in the Avalence Hydrofiller 50-6500-50RG system, but there is still a driving force for the two gases to mix by permeating through the cell membrane. WO 2004/076721A2 discloses that the separation membrane selectively allows passage of liquid but not gas through it and keeps the hydrogen and oxygen gases separated as the generated gas bubbles rise through the liquid electrolyte, but is silent in respect of materials to perform these functions.

US 2010/0187129A discloses a method for producing electrolyzed water, comprising: using an electrolyzing apparatus of water having a structural feature to divide an electrolyzer into an anode chamber and a cathode chamber by a diaphragm, and arranging an anode plate in the anode chamber and a cathode plate in the cathode chamber; carrying out the electrolysis by filling the cathode chamber with water to which electrolyte is previously added; wherein the flow rate of water to be provided to the cathode chamber is restricted to 40 mL/min. [0.67 mL/s] per 1 A of loading electric current or less; wherein the water provided to the cathode chamber is previously softened sufficiently to prevent the formation of scale; and adding non-softened water for dilution with the electrolyzed water produced in the anode and/or cathode chambers to minimize the amount of softened water required to produce electrolyzed water and prepare electrolyzed water sources having desired pH ranges. However, US 2010/0187129A1 is silent in respect of oxygen and hydrogen diffusion or use at high pressures and discloses non-conductive diaphragm materials and is silent in respect of separation membrane materials.

US 2010/0276299A1 discloses a method for increasing the efficiency of a high-pressure [340 to 690 bar (34 to 69 MPa)] electrolysis cell having an anode and a cathode defining an interior portion therebetween, the method comprising: decreasing the current density at the anode and reducing an overvoltage at the anode as the high-pressure electrolysis cell is operated; and decreasing the amount of hydrogen permeation through the cell membrane from the cathode chamber to the anode chamber as the high-pressure alkaline-electrolysis cell is operated. US 2010/0276299A1 particularly discloses high pressure electrolysis cells with separators having cylindrical outer and inner surfaces.

WO 2008/048103A1 discloses an electrolysis device comprising a container having an outer wall, said container being vertically divided into four serial chambers, electrodes being located in the first and last of said chambers, said chambers being separated from each other by semipermeable membranes, wherein the semipermeable membranes are substantially permeable to cations and the semipermeable membranes are preferably substantially impermeable to multivalent cations, a liquid inlet and a liquid outlet being provided to the second chamber, a liquid inlet and a liquid outlet being provided to the third chamber, and a liquid inlet and outlet being provided to the last chamber, said liquid outlet and said liquid inlet being connected to a multivalent cation removal device. However, WO 2008/048103A1 is silent in respect of the diffusion of gas.

This prior art is silent in respect of suitable separators to avoid cross-contamination of the hydrogen and oxygen produced. Separators for use in alkaline water electrolysis cells should be spontaneously self-wettable, ion-permeable, chemically, thermally, dimensionally and mechanically stable and have a low ionic resistance, since the resistance of a separator accounts for up to 80% of the total resistance of an alkaline water hydrolysis cell. Most commercial electrolysers today still use asbestos as a separator. However asbestos is a highly carcinogenic substance. Moreover, the thinnest asbestos diaphragms are 3-4 mm thick, thus limiting the realisable ohmic resistance, and they cannot be used above 85° C. or with aqueous potassium hydroxide concentrations above 30 wt %, making it unsuitable for future applications. A major problem with candidates to replace asbestos as separator materials is their lack of hydrophilicity, their difficult-to-control manufacturing process and their high associated cost. Research work has been carried out on separators based on potassium titanate, polyantimonic acid, polysulphones, hydrophilised polyphenylene sulfide, poly (vinylidene fluoride) (PVDF) and PTFE. None of these materials has been demonstrated to be suitable for future application in electrochemical cells involving the production or consumption of at least one gas.

WO 93/15529A discloses a method for making a porous membrane with a symmetrical structure which is gas-tight when saturated with electrolyte and whereby, according to this method, a solution is made from an organic binding agent in a solvent and the solvent is removed by means of extraction through immersion in an organic non-solvent, characterized in that an amount of metal oxide and/or metal hydroxide is added to the solution. WO 93/15529A further discloses a membrane made according to this method and an electrochemical cell containing said membrane between two electrodes preferably characterized in that it is an alkaline cell and in that the membrane is saturated with electrolyte and thus forms a separator between two electrodes. WO 93/15529A exemplifies separators based upon polysulphone as the binder and zirconium oxide or zirconium oxide and zinc oxide as the metal oxide or hydroxide without using reinforcing polymer supports. Such non-reinforced separators have been commercialized as ZIRFON® separators and exhibit good wettability, low ionic resistance and a high bubble point, but have a typical asymmetric pore structure with finger-like cavities and take 30 minutes [1800 s] to manufacture all of which is unfavourable.

WO 2006/015462A discloses a process for preparing an ion-permeable web-reinforced separator membrane, comprising the steps of: providing a web and a suitable paste, guiding said web in a vertical position, equally coating both sides of said web with said paste to produce a paste-coated web, and applying a symmetrical surface pore formation step and a symmetrical coagulation step to said paste coated web to produce a web-reinforced separator membrane. WO 2006/015462A further discloses a web-reinforced separator membrane, characterised in that the web is positioned in the middle of the membrane and both sides of the membrane have the same pore size characteristics and an apparatus for providing a web-reinforced separator membrane, comprising a web-unwinding station for web-tension control, a spreader roller, a coater with double-side coating with double-sided coating system with automatic paste feeding with vertical (guided) web transportation, and guiding rollers in a heated coagulation bath.

A poster presented by W. Doyen et al. at the World Hydrogen Technologies Convention, held at Montecatini Terme in Italy between 4th and 7 Nov. 2007, reported the development of an advanced separator in three thicknesses (250, 550 and 950 µm) and in two temperature versions (80° C. and 120° C.) for use in high temperature alkaline water electrolysis, referred to as the "NEW-ZIRFON® separator. The "NEW-ZIRFON® separator is reinforced with a polypropylene, ETFE or PEEK fabric and exhibits permanent hydrophilicity, good wettability in strongly alkaline solutions, low ionic resistance (0.13 $\Omega \cdot cm^2$ in 6M KOH at 70° C. for the 550 µm thick version), capability of operating at current densities up to 10 $kA/m^2$, no dimensional changes, a tensile strength of at least 25 MPa, a symmetric pore structure, a total porosity between 50 and 55%, a bubble point above 7 bar (0.7 MPa) and a double skinlayer with identical pores at both sides (mean value 0.08 µm) thereby offering a double safety for preventing the mixing of gases. Double skinlayer means a separator with two denser layers (with pores with a diameter smaller than 0.1 µm) at its two outside surfaces, one each side of the separator (one at the upper side, the other at the bottom side). Between these both layers there is a solid layer (more than 80% of the thickness) with much more open pores with a diameter of between several microns to a maximum of 10 µm. However this intermediate layer is not an open space channel with low hydraulic resistance for electrolyte circulation/passage. Its resistance for flow passage is so high that it is not useful for the "free" circulation of electrolyte. W. Doyen et al. also discloses that the continuous vertical double-sided coating process disclosed in WO 2006/015462A1 is capable of manufacturing 50 cm wide separators.

WO 2009/147086A1 discloses an apparatus for producing an ion-permeable web-reinforced separator comprising a duplex type impregnating apparatus comprising two slots each with upper and lower slot faces, said faces having a vertical orientation or an orientation which may deviate from vertical by no more than 10°, for providing premetered quantities of a dope simultaneously to either side of an elongated porous web, said quantities on both surfaces are identical or may deviate from identical by no more than 5%, a transport means providing for downwards transport of said elongated porous web through said duplex impregnating apparatus, said downwards transport having a vertical orientation or an orientation which may deviate from vertical by no more than 10°, and subsequent phase inversion, coagulation and washing stations, said phase inversion station providing for phase inversion of said dope and said coagulation station providing for coagulation and washing of solvent from the resulting phase-inverted dope, wherein there is an air gap between said duplex impregnating apparatus and said phase inversion station and wherein the distance between the lower faces of each impregnating apparatus is greater than the distances between the upper faces of each impregnating apparatus. WO 2009/147084A1 discloses a process comprising the steps of: (i) providing an elongated porous web, said elongated porous web comprising two outermost surfaces; (ii) transporting said elongated porous web downwards between two impregnating heads [6] and [6'] comprising two slots each with upper and lower slot faces, said faces having a vertical orientation or an orientation which may deviate from vertical by no more than 10°, parallel to said elongated porous web providing simultaneously to both surfaces of said elongated porous web metered quantities of a dope, said quantities on both surfaces are identical or may deviate from identical by no more than 5%, comprising at least one membrane polymer and at least one solvent therefor; (iii) thereby impregnating said elongated porous web completely with said dope and providing dope layers on each surface of said outermost surfaces of said elongated porous web with an equally thickness or a thickness which may deviate from equally by no more than 5%, said thickness being independent of the gap between one of said lower slot faces and the surface of said elongated porous web nearest thereto; (iv) subjecting said dope associated with said elongated porous web immediately after dope-impregnation to phase inversion with at least one non-solvent wherein said phase inversion of said dope layer is symmetrical on each surface of said web, thereby forming a membrane; and (v) removing residues of said at least one solvent for said at least one membrane polymer from said membrane thereby producing an ion-permeable web-reinforced separator, characterised in that said dope is shear-thinning. Example 1 exemplifies the double-sided coating of the 3D spacer fabric FC 360/50PW with metal oxide-containing dope and discloses that the substantially hollow by-pass channel between the continuous regions of the fabric is also filled with dope. Applications of the ion-permeable web-reinforced separators were envisaged in batteries e.g. in non-aqueous secondary batteries that employ a lithium-containing transition metal oxide as the positive electrode, a lithium dopable/dedopable carbon-based material as the negative electrode and a non-aqueous electrolyte solution as the electrolyte solution (lithium ion secondary batteries); in fuel cells; and in electrolytic or electrochemical cells e.g. in local hydrogen generators in which the hydrogen is produced by the electrolysis of water.

Separators on the basis of the technology of WO 2009/147084A1 and WO 2009/147086A1 in which the integrated permeate channel is filled with dope have been commercialised by AGFA-GEVAERT N.V. as ZIRFON® PERL separators for alkaline water hydrolysis as replacement materials for chrysotile asbestos and PPS cloth. Moreover, it is claimed in its publicity material dated July 2009 that such separators allow for highly efficient cell operation at high current densities with high durability.

EP 1625885A1 discloses a membrane, comprising a permeate channel consisting of a 3D spacer fabric having an upper and a lower fabric surface spaced apart by monofilament threads at a predefined distance, said permeate channel being interposed between two membrane layers, wherein said membrane layers are linked at a multitude of points with said upper and lower fabric surfaces. EP 1625882A1 discloses that the membrane layer preferably comprises a hydrophilic filler material selected from the group consisting of HPC, CMC, PVP, PVPP, PVA, PVAc, PEO, TiO2, HfO$_2$, Al$_2$O$_3$, ZrO$_2$, Zr$_3$(PO$_4$)$_4$, Y$_2$O$_3$, SiO$_2$, perovskite oxide materials, SiC; and an organic binder material selected from the group consisting of PVC, C-PVC, PSf, PESU, PPS, PU, PVDF, PI, PAN, and their grafted variants, but no materials are exemplified. As applications for such membranes MBR, microfiltration, ultrafiltration, membrane distillation, pervaporation, vapour permeation, gas separation, supported liquid membranes and pertraction were included. Although EP 1625885A1 is silent in respect of porosity in general and pore size and bubble point in particular, microfiltration and ultrafiltration both require materials with 50 to 80% porosity, but it contains no hint or indication that such membranes could function as a separator. W. Doyen et al. disclosed at Achema an innovative back-washable flat sheet membrane envelope having as key elements the use of 3D spacer-fabrics as supporting and permeate drainage structure and membrane layers directly coated on both sides thereof with the hollow by-pass channel between the faces being used for permeate collection or as a drainage chamber, see FIG. 1. During coating filling up of the hollow by-pass channel is avoided by using a specially developed textile, an adequate dope viscosity and an appropriate coating process.

Kerres et al. in 1996 in Desalination, volume 104, pages 47-57, describes evaluation of microporous polymeric membranes just produced from poly(ethersulphone)s UDEL®, RADEL R®, RADEL A® and VITREX® in advanced alkaline electrolysis and reported that these membranes meet all requirements as diaphragms, like low resistance connected with sufficiently high pressure stability to avoid gas intermixture in the electrolysis compartments, although these cells had no long-term stability. Furthermore, Lu et al. in 2007 in Journal of Membrane Science, volume 300, pages 205-210, report the application of a homogeneous blend membrane made from poly(ether sulphone) and poly(vinylpyrrolidone) to alkaline water hydrolysis.

Although the use of ZIRFON® PERL separators in alkaline water hydrolysis result in highly efficient cell operation at high current densities with proven long-term stability, permanent hydrophilicity, small pore size, symmetric pore structure and reinforcement by an open mesh fabric (ETFE, PP etc.), such separators do not offer a solution to the problem of the cross contamination of the hydrogen and oxygen produced by alkaline water electrolysis at high pressures.

SUMMARY OF THE INVENTION

WO 2009/147086A1 discloses the preparation of separators by the double-sided coating of 3D spacer fabrics, but the integrated hollow channel is filled to provide, a total porosity between 50 and 55%, a bubble point above 7 bar (0.7 MPa] and a double skinlayer with identical pores at both sides (mean value 0.08 μm) thereby offering a double safety for preventing the mixing of gases. Double-skin layer means a separator with two denser layers (with pores with a diameter smaller than 0.1 μm) at its two outside surfaces, one each side of the separator (one at the upper side, the other at the bottom side) thereby reducing the cross-contamination of the hydrogen and oxygen produced. Between these layers there is a solid layer of separator material (more than 80% of the thickness) with much more open pores with a diameter of between several microns to a maximum of 10 μm.

Surprisingly it has been found that, membranes according to EP 1625885A1 using particular ingredients amongst the wide range disclosed therein provide an integrated permeate channel with porous membranes which upon saturation with electrolyte provide the gastightness and ion permeability required for a separator for use in electrochemical cells, while additionally reducing the cross-contamination of the gases produced over that realised by the above-described double-skin approach. The integration of the channel in the separator results in the separator having a back-washing resistance of at least 1 bar (0.1 MPa]. Alternatively, a separator can be realised by providing a configuration consisting of two separator elements with a spacer, which provides the back-washing resistance of at least 1 bar (0.1 MPa) necessary to provide for electrolyte flow through the separator elements. This so-called "e-by-pass separator" is a three-element separator composite, which is composed of two adjacent separator elements which are configured with a spacer or tied together and spaced-apart at the same time providing an electrolyte by-pass-channel between the two separator elements. If a spacer fabric is used, not only does the e-by-pass separator provide an internal channel between the separator elements with monofilamentary pillars fulfilling the role of a spacer whose geometry does not change as a result of changes in pressure, i.e. the by-pass-channel is always open over the complete surface of the separator elements and does not collapse or explode, without the need for a spacer material between the two separator elements to keep the channel open. In one embodiment this special separator structure is obtained by impregnating the two outer layers of a 3D spacer fabric with a Zirfon organomineral dope and then phase-inverting the dope to provide separator elements i.e. dosing the dope so that the volume between the two outer layers is not filled as in the case of the double-skin approach as is the case with the separators disclosed in WO 2009/147086A1. The resulting internal electrolyte channel is used for creating an electrolyte circulation by-pass stream, between and through the two adjacent separator elements. In this by-pass, the electrolyte which is free from dissolved gases, will be forced to flow through the complete surface of the two separator elements. In this way the hydrogen gas that is dissolved in the catholyte compartment as a consequence of pressure is completely prevented from diffusing to the anolyte compartment. This is a major breakthrough in pressurized alkaline water electrolysis especially in high pressure electrolysers with high solubility of the gases at the high pressures used. As a result of this method of operation the purity of the gases is independent of the operational conditions such as current density, pressure and temperature. This novel separator can be used in high pressure electrolytic cells and in fuel cells in a variety of cell configurations.

It is an object of the present invention to provide a separator for use in high pressure electrochemical cells e.g. high-pressure alkaline water electrolysis cells and high pressure air fuel cells with reduced cross-contamination of the hydrogen and oxygen produced therewith or consumed therein.

A further advantage of the separator of the present invention is that it is geometrically stable with changes in pressure i.e. it does not collapse or explode.

A still further advantage of the present invention is that the flow of electrolyte through the integrated hollow by-pass channel removes corrosion products, thereby maintaining the ionic conductivity of the cell and enables a constant cell temperature to be maintained.

A still further advantage of the present invention is equalisation of the concentration of the electrolyte in both anolyte and catholyte of electrolytic cells because they are mixed just after they leave gas separators and just before they enter into the third compartment which leads to a slightly lower cell voltage since the electrolyte conductance is highest.

A still further advantage of the present invention is that the separator elements are sufficiently resilient to follow the contours of the pre-electrodes in the catholyte and anolyte compartments thereby avoiding gas bubbles between the surface of the separators and the respective pre-electrodes and reducing the resistance of the electrochemical cell comprising the separator.

According to a first aspect of the present invention an ion-permeable reinforced separator is provided, comprising at least one separator element and a substantially hollow by-pass channel contiguous with said at least one separator element, wherein said at least one separator element comprises a binder and a metal oxide, hydroxide, phosphate or titanate dispersed therein and said separator element has a bubble point with water when filled at ambient temperature of at least 1 bar (0.1 MPa) and a back-wash resistance of at least 1 bar (0.1 MPa).

According to a second aspect of the present invention, use is provided of the ion-permeable reinforced separator of the first aspect of the present invention in electrochemical cells involving the production or consumption of at least one gas and in particular in high-pressure electrochemical cells.

According to a third aspect of the present invention an electrochemical cell is provided, said electrochemical cell comprising the ion-permeable reinforced separator of the first aspect of the present invention.

According to a fourth aspect of the present invention a method is provided, said method comprising the production of hydrogen in an electrolytic cell, wherein the electrolytic cell comprises the ion-permeable reinforced separator of the first aspect of the present invention and electrolyte fills and optionally flows through the integrated substantially hollow by-pass channel between and through the at least one contiguous separator element and thereby assists the evacuation of the gases from the catholyte and anolyte compartments.

According to a fifth aspect of the present invention a process is provided, said process comprising the production of electricity in a fuel cell, wherein the fuel cell comprises the ion-permeable reinforced separator of the first aspect of the present invention and electrolyte fills and optionally flows through the integrated substantially hollow by-pass channel contiguous with the at least one separator element.

According to a sixth aspect of the present invention an ion-permeable web-reinforced separator is provided, said ion-permeable web-reinforced separator comprising two separator elements separated by an (optionally integrated) substantially hollow (by-pass) channel, wherein the separator elements each comprise a binder and a metal oxide or hydroxide dispersed therein and the separator elements have a back-wash resistance of at least 1 bar (0.1 MPa), with a back-wash resistance of at least 5 bar (0.5 MPa) being preferred, whereby an internal electrolyte by-pass channel is created.

According to a seventh aspect of the present invention, use is provided of the ion-permeable web-reinforced separator of the sixth aspect of the present invention in electrochemical cells involving the production or consumption of at least one gas and in particular in high-pressure electrochemical cells.

According to a eighth aspect of the present invention an electrochemical cell is provided, said electrochemical cell comprising the ion-permeable web-reinforced separator of the sixth aspect of the present invention.

According to a ninth aspect of the present invention a method is provided, said method comprising the production of hydrogen in an electrolytic cell, wherein the electrolytic cell comprises the ion-permeable web-reinforced separator of the sixth aspect of the present invention and electrolyte fills and optionally flows through the integrated substantially hollow (by-pass) channel between and through the separator elements and thereby assists the evacuation of the gases from the catholyte and anolyte compartments.

According to a tenth aspect of the present invention a process is provided, said process comprising the production of electricity in a fuel cell, wherein the fuel cell comprises the ion-permeable web-reinforced separator of the sixth aspect of the present invention and electrolyte fills and optionally flows through the integrated substantially hollow (by-pass) channel between the separator elements.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
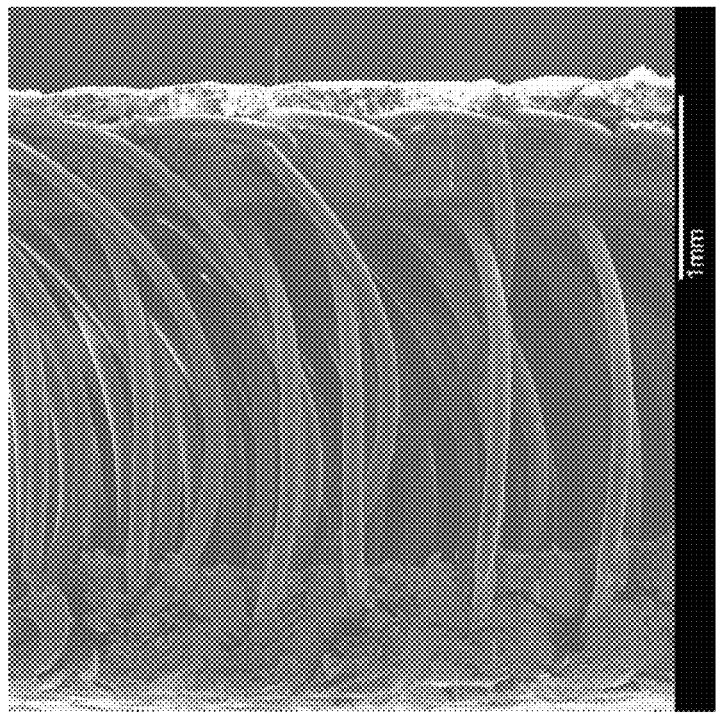
FIG. 1 is a SEM image of the ion-permeable 3D spacer fabric-reinforced separator in which the faces of the spacer-fabric containing the multifilaments are used for anchoring the separator elements resulting from phase inversion of the impregnated dope on the two sides of the 3D spacer fabric leaving a hollow by-pass channel thereby realising a channel for electrolyte between the two separator elements.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

Definitions

The term "web", as used in disclosing the present invention, means something formed by or as if by weaving or interweaving; a woven fabric; an elongated porous fabric; an elongated grid or mesh e.g. a wire mesh; an intricate pattern or structure suggestive of something woven; and a thin sheet, plate, or strip, for example of plastic or metal.

The term "membrane", as used in disclosing the present invention, means a medium through which a fluid passes for the purposes of filtration.

The term "separator", as used in disclosing the present invention, means a porous membrane, which maintains saturation with (e.g. aqueous) electrolyte, maintains gastightness and maintains ion permeability i.e. it offers a very low resistance to the transport of ions thereby rendering it suitable for use in electrochemical cells at 100° C. for at least 10,000 h (ca. 1 year) operation and preferably for at least 50,000 h (ca, 5 years) operation.

The term "elevated-pressure" in the term "elevated-pressure alkaline-electrolysis cell", as used in disclosing the present invention, means pressures above 1 bar (0.1 MPa), preferably above 10 bar (1 MPa).

The term "substantially hollow by-pass channel", as used in disclosing the present invention, means a channel having walls with each of said walls having a side internal to said channel and a side external to said channel, wherein a side external to said wall of said channel is contiguous with a separator element, or wherein more than one e.g. two external sides of said walls of said channel are contiguous with a separator e.g. to form a sandwich structure either side of said channel. Preferably, a side external to said wall of said channel is non-separably linked to at least one of the separator elements. Particularly preferably the term "substantially hollow (by-pass) channel", as used in disclosing the present invention, means a channel allowing unhindered flow of electrolyte, so that a flow can be maintained through the channel and enables a flow pressure through the channel which is at least 50 mbar (5 kPa) lower than the flow pressure through the separator elements with the flow pressure differential being preferably less than 500 mbar (50 kPa), while avoiding pressure drop within the channel.

The term "integrated substantially hollow by-pass channel", as used in disclosing the present invention, means that the web reinforcing the separator elements is a 3D-spacer fabric which itself provides the substantially hollow by-pass channel.

The term "spacer fabric", as used in disclosing the present invention, is a three dimensional textile structure which contains two faces which are connected with a monofilament spacer yarn. As a result a very open structure is obtained. The hollow structure of the spacer fabric can be used as a substantially hollow by-pass channel of the ion-permeable reinforced separator of the present invention, the faces of the spacer fabric then being used for anchoring the separator elements.

The term "bubble point", as used in disclosing the present invention, means, as is well-known to a person skilled in the art, that pressure needed to drive a liquid, e.g. water, out of the pores of a porous membrane under operating conditions. The 'Bubble Point' test measures the pressure required to release the first bubble from the surface of a porous material submerged in a liquid and pressurized from one side. This Bubble Point test is an industry standard for estimating the maximum pore size of a material. The bubble point test is based on Darcy's Law to correlate the measured bubble point pressure value to the calculated maximum pore size. Rakesh Patel, Devarshi Shah, Bhupendra G. Prajapti and Manisha Patel, "Overview of industrial filtration technology and its applications", Indian Journal of Science and Technology Vol. 3 No. 10 (October 2010), 1121-1127 at page 1126, described the bubble point test as follows: "The bubble point is a direct measure of the largest pore in the filter. The membrane or cartridge is first wetted and the inlet side of the housing drained free of liquid. The outlet, still containing liquid, is connected via tubing to a vessel containing the wetting liquid. Air pressure is then applied at the inlet until a continuous stream of bubbles appears in the vessel. The pressure at which this occurs is the bubble point. The size of the largest pore may then be related to the pressure via Darcy's law. The bubble point will vary with pore size, wetting liquid, filter media, and temperature [see V. Choa et al., Geotextiles Geomembranes, volume 27, pages 152-155 (2009)]." Ph. Vermeiren et al, in J. Porous Materials (2008) volume 15(3), 259-264, described the determination of a bubble point for a separator as follows: "The bubble point pressure is the [minimum] pressure needed to blow air through a liquid-filled separator. To determine the BP pressure, the top [side] of the [horizontally positioned] separator is placed in contact with a liquid such as water or an alcohol which fills all the pores when the separator is wetted. The bottom [side] of the separator is in contact with air and the air pressure is gradually increased. The pressure corresponding to the first air bubble penetrating through the separator is called the BP pressure." It can be measured by standard test procedures such as described in ASTM E128 and ISO 4003. The standard test procedure (ARP 901/ISO 4003) calls for isopropyl alcohol (IPA) as the test fluid and maintaining a 0.5 inch (12.7 mm) head of fluid over the top surface of the filter. The expression "bubble point" is always used when referring to water being present in the pores of a hydrophilic membrane. It is well known to a person skilled in the art that the pores in a separator membrane should be wet at all times for the separator to fulfil its function. The pressure difference over the electrodes should not exceed 0.3 bar (0.03 MPa), or should be well below 1 bar (0.1 MPa), in order for the pores to remain wet. The criterion for the current separator that the bubble point should be at least 1 bar (0.1 MPa), therefore means that under normal operating conditions i.e. for pressure differences over the electrodes well below 1 bar (0.1 MPa), the pores will remain wet. A bubble point lower than 1 bar (0.1 MPa) would mean that the separator would not be able to fulfil its function due to the dryness of the pores. Bubble point is a standard characteristic of a porous material such as a "Zirfon separator", see Ph. Vermeiren et al, "The influence of manufacturing parameters on the properties of macroporous Zirfon® separators", J. Porous Materials (2008) volume 15(3), 259-264.

The term "back-wash resistance", as used in disclosing the present invention, means resistance of the integrity of the separator to liquid flow pressures from the internal channel to the surface of the separator elements. Backwash resistance is also a standard characteristic of a porous material such as a "Zirfon separator", see Ph. Vermeiren et al, "The influence of manufacturing parameters on the properties of macroporous Zirfon® separators", J. Porous Materials (2008) volume 15(3), 259-264.

The term "high-pressure" in the term "high-pressure alkaline-electrolysis cell", as used in disclosing the present invention, means pressures above 50 bar (5 MPa), preferably above 100 bar (10 MPa) and preferably below 1000 bar (100 MPa).

The term "electrochemical cell", as used in disclosing the present invention, means a device for turning chemical energy into electrical energy, known as a voltaic or galvanic cell, or, alternatively, changing electrical energy into chemical energy, known as an electrolytic cell, and involves a combination of two electrodes arranged so that an overall oxidation-reduction reaction produces an electromotive force. Batteries consisting of one or more cells connected to each other and fuel cells are examples of voltaic cells.

The term "electrolytic cell", as used in disclosing the present invention, means a cell in which electrical energy is changes into chemical energy e.g. electrolysis.

The term "fuel cell", as used in disclosing the present invention, means an electrochemical device in which the reaction between a fuel, such as hydrogen, with an oxidant, such as air, converts the chemical energy of the fuel directly into electrical energy without combustion.

The term "dope", as used in disclosing the present invention, means a composition which can be converted into a membrane in at least one subsequent process step.

The term "substantially flat", as used in disclosing the present invention, means having no macroscopic curvature.

The term "substantially free", as used in disclosing the present invention, means less than 10%.

The terms slot and die are used interchangeably in the present text and mean an opening, which depending upon the viscoelastic properties of the dope issuing from the slot during the impregnation process is deposited on the elongated porous web using slot or extrusion coating techniques. Slot and extrusion coating techniques belong to a class of coating method known as premetered coating in which the thickness of the coated liquid layer is in principle set by the flow rate fed to the die, the width of the elongated porous web and the speed of the substrate moving past and is independent of other process variables. The term "lips of the slot" means, for a slot disposed perpendicular to the transport direction of the fabric, those parts of the impregnation head parallel to the transport direction which are on one or other side of the slot.

The term "substantially identical quantities", as used in disclosing the present invention, means deviating by no more than 5%.

The term "substantially vertical", as used in disclosing the present invention, means deviating from the vertical by no more than 10°.

The abbreviation ECFTE represents a copolymer of ethylene and chlorotrifluoroethylene and is known by the trade-name HALAR®.

The abbreviation EFTE represents a copolymer of ethylene and tetrafluoroethylene.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Steps may be added or deleted to methods described within the scope of the present invention.

Elongated Porous Web

Elongated porous webs for use in the elongated ion-permeable web-reinforced separator, according to the present invention, include elongated porous fabric e.g. woven or non-woven fabric (e.g. felt), elongated mesh e.g. wire mesh, elongated grid, elongated porous thin sheet, elongated plate, or elongated strip The elongated porous web may incorporate a channel or the elongated porous web may incorporate a channel as a result of further processing, e.g. via lamination (e.g. by forming a tri-laminate) or by an extrusion process to form a multiwall sheet, plate or strip, for example of plastic or metal.

A preferred embodiment of an elongated porous web is a channel or a channel precursor i.e. a configuration which upon further processing provides a channel with a non-conductive elongated mesh on at least one side thereof.

Another preferred embodiment of the elongated porous web is a 3D spacer fabric. 3D spacer-textiles are made by a weaving or knitting process and basically consist of two faces or walls (the outer layers containing mono or multi-filament fibres), which are connected with each other by a multitude of monofilament spacer yarns (up to 10 per cm in each direction), which make them very robust and almost inseparable hollow structures. These materials are inseparable due to the loops in the monofilaments in the face areas. So these structures contain three distinguishable elements: the two faces (each about 0.5 mm thick), and a hollow (by-pass) channel in between them, formed by the multitude of monofilament spacer yarns. In the separators of the present invention, the spacer-fabric containing the mono- or multi-filaments is used for separator anchoring, whereas the hollow (by-pass) channel in between them is used for electrolyte. In practice the height of the hollow (by-pass) channel in between the faces can be in between 0.4 and 10 mm, and depends upon the length of these spacer yarns and avoidance of pressure drop over the channel.

These 3D spacer fabrics are typically knitted in a tubular form and can either be used as such or in a cut form. If used as such a cylindrical separator is realised with an integrated substantially hollow (by pass) channel.

The choice of material for the 3D spacer fabric for separators is dependent upon the application envisaged aggressive environments such as high alkalinity electrolytes or fuel cells require 3D spacer materials capable of withstanding such environments.

According to a preferred embodiment of the elongated porous webs for use in the elongated ion-permeable web-reinforced separator, according to the first aspect of the present invention, the elongated porous web is a 3D spacer fabric chemically and thermally stable in aqueous 25 to 35 wt % potassium hydroxide solutions at or above 85° C.

Hence polyester, the standard material used fpr membrane purposes and support purposes in IPC (International Products Corporation) filtration membranes is unsuitable in the ion-permeable reinforced separator of the present invention if operated with highly alkaline electrolytes at low temperatures. Suitable materials for the spacer fabric include polypropylene (PP), polyamide/nylon (PA), polyethersulphone (PES), polyphenylenesulphide (PPS), polyethylene and polyester [e.g. polyethylene terephthalate (PET)], and basalt for low temperature (<80° C.) applications and polyetheretherketone (PEEK), monochlorotrifluoroethylene (CTFE), copolymers of ethylene and chlorotrifluoroethylene (ETFE), copolymers of ethylene and tetrafluoroethylene (ETFE) and m-aramide for high temperature (<120° C.) applications, with the preferred material being PPS, which is resistant to aqueous 30 wt % KOH solutions at temperatures up to 165° C. Other preferred materials are polypropylene (PP) and polyoxymethylene/polyacetal (POM) which are resistant to aqueous 30 wt % KOH solution up to 80° C. Such fabrics may be woven or non-woven, but are preferably woven.

At a temperature of 150° C. the average crimp of the ETFE-meshes after 45 minutes [2700 s] was 10-15% and that of polypropylene meshes was greater than 30%. At a temperature of 230° C. the average crimp of ETFE-meshes was greater than 30%.

According to a preferred embodiment of the elongated porous webs for use in the elongated ion-permeable web-reinforced separator, according to the first aspect of the present invention, the elongated porous web is a 3D spacer fabric which does not elongate in the non-thickness directions and is resilient in the thickness direction, whereas the support materials of spacer materials used in IPC filtration membranes must have the highest possible compaction resistance in order to withstand differential pressure upon filtration (from outside the IPC to its inside). In the elongated ion-permeable web-reinforced separator, according to the first aspect of the present invention, resilience in the thickness direction is a key property for realizing the preferred zero-gap configuration with the electrodes i.e. direct contact of the electrodes to the separator elements. This enables the separator to follow the irregularities in flatness of large electrodes (0.5 to 2.5 $m^2$).

The open area of the elongated porous web is preferably between 30 and 70%, with an open area in the range of 40 to 60% being particularly preferred.

According to a preferred embodiment of the elongated porous webs for use in the elongated ion-permeable web-reinforced separator, according to the first aspect of the present invention, the elongated porous web is a 3D spacer fabric with an open area of at least 30%, with open areas of 30 to 50% being preferred.

According to a preferred embodiment of the elongated porous webs for use in the elongated ion-permeable web-reinforced separator, according to the first aspect of the present invention, the elongated porous web is a 3D spacer fabric with an open area of less than 60%., with less than 55% being preferred.

According to a preferred embodiment of the elongated porous webs for use in the elongated ion-permeable web-reinforced separator, according to the first aspect of the present invention, the elongated porous web is a 3D spacer fabric with the at least one face having a thickness of 250 to 350 µm. In these faces the filaments of the spacer yarn and the monofilament spacer yarn come together and these three monofilament cross each other. So the thickness of the faces is determined by the sum of the diameters of the used yarns. The face thickness is a function of the monofilament yarn diameter with a face thickness of 300 µm being obtained with a monofilament yarn diameter of 100 µm, whereas yarn diameters of 150 µm or higher are used in filtration membranes. With a face thickness of 300 µm a 500 µm thick defectless Zirfon® layer can be realised.

According to a preferred embodiment of the elongated porous webs for use in the elongated ion-permeable web-reinforced separator, according to the first aspect of the present invention, the elongated porous web is a 3D spacer fabric with two faces tied together and spaced apart forming a substantially hollow by pass channel, the faces having a thickness of 250 to 350 µm.

The total thickness of the spacer fabric should be as low as possible in order to minimize the areal resistance of the ion-permeable reinforced separator of the present invention. The elongated porous web is preferably capable of being wound on a winding roller. The elongated porous web preferably has a thickness of at least 500 µm and particular preferably a thickness of at least 1250 µm. The elongated porous web preferably has a thickness of at most 10 mm (10000 µm).

However, it may not be technically feasible to realise a hollow by-pass channel when casting on a SF with thickness of less than 1 mm.

According to a preferred embodiment of the elongated porous webs for use in the elongated ion-permeable web-reinforced separator, according to the first aspect of the present invention, the elongated porous web is a 3D spacer fabric with two faces tied together and spaced apart forming a substantially hollow by pass channel, the total elongated porous web has a total thickness between 1 and 3 mm.

The pores or mesh opening preferably have an average diameter between 100 and 1000 µm, with an average diameter of 300 to 700 µm being particularly preferred.

The elongated porous web is preferably symmetrical with substantially identical pore sizes/mesh sizes on either side of the web.

The elongated porous web is preferably a woven fabric. The elongated porous web preferably has a MacMullin number in the range 2 to 20 and particularly preferably in the range of 2 to 15. The MacMullin number is an index of ion permeability and it is the value of the conductivity of the electrolyte alone divided by the conductivity with the electrolyte solution impregnated in the support i.e. the ion permeability increases as the number increases.

Dope

The dope for coating the 3D spacer fabric comprises at least one membrane polymer and at least one organic solvent therefor and optionally further contains and at least one pore formation promoting material and optionally at least one polar organic solvent. The dope applied to the two surfaces of the 3D spacer fabric may be the same or different.

The dope preferably comprises at least one membrane polymer, at least one polar solvent and at least one stabilizing agent, such as glycerol, and optionally further contains and at least one pore formation promoting material. Hydrophilizing and stabilizing agents such as polypropylene glycol, ethylene glycol, tripropylene glycol, polyethylene glycol such as PEG 8000 and PEG 20000, glycerol, polyhydric alcohols such as glycerine, dibutyl phthalate (DBP), diethyl phthalate (DEP), diundecyl phthalate (DUP), isononanoic acid, and neodecanoic acid can also be incorporated after the phase-inversion process is completed, but before drying.

Often a variation in solvent mixture will give rise to different film morphologies and hence in membrane performance. Suitable membrane polymers include polysulphone (PSU), polyvinyl idene fluoride (PVDF), poly (acrylonitrile) (PAN), polyethyleneoxide (PEO), polymethylmethacrylate or copolymers thereof, PVDF, VDF-copolymers and organic polymer compounds composed primarily of PVDF are particularly preferred from the standpoint of oxidation/reduction-resistance and film-forming properties. Among these, terpolymers of vinylidene fluoride (VDF), hexafluoropropylene (HFP) and chlorotrifluoroethylene (CTFE) are preferred for their excellent swelling property, heat resistance and adhesion to electrodes. Suitable pore formation promoting materials include polymers. Suitable hydrophilic polymers include poly(vinyl pyrrolidone) (PVP), crosslinked polyvinylpyrrolidone (PVPP), poly(vinyl alcohol), poly (vinyl acetate), methyl cellulose and polyethylene oxide.

Suitable inorganic materials include $TiO_2$, $Al_2O_3$, $ZrO_2$, $Zr_3(PO_4)_4$, $BaTiO_3$, $SiO_2$, perovskite oxide materials, SiC and C(Pt/Rh/Ru), with metal oxides and hydroxides being preferred e.g. a zirconium oxide or a titanium oxide. Inorganic oxides and hydroxides have the additional advantage of increasing the ionic conductivity of the ion-permeable web-reinforced separator. Suitable polar organic solvents include N-methyl-pyrrolidone (NMP), N-ethyl-pyrrolidone (NEP), N,N-dimethylformamide (DMF), formamide, dimethyl sulphoxide (DMSO), N,N-dimethylacetamide (DMAC), acetonitrile and mixtures thereof. Films formed by immersion of a polysulphone-NMP solution in water are porous. However, different membrane structures can be obtained upon immersion of a polysulphone-NMP-THF solution in water.

It has been found that the cockling (waviness) and curl of the ion-permeable web-reinforced separator is largely due to the ion-permeable web-reinforced separator not being entirely symmetric and in particular to the elongated porous web not being positioned centrally in the ion-permeable web-reinforced separator. Setting the distance between the lower lip faces of the impregnation heads greater than that between the higher lip faces can also aid centring of the elongated porous web, particularly in the case of thinner elongated porous webs. The offset between the lower lip faces and the higher lip faces can be 100 µm or more. Increasing the viscosity of the dope also improves the central positioning of the elongated porous web in the ion-permeable web-reinforced separator, but above a critical viscosity this adversely affects the penetration of the elongated porous web by the dope. However, it has also been found that the use of shear-thinning dopes enables the cockling (waviness) of the ion-permeable web-reinforced separator to be reduced without having to use viscosities which adversely affect the dope-penetration of the elongated porous web.

The dope preferably has a ratio of viscosity at a shear of 1 s$^{-1}$ to the viscosity at a shear of 100 s$^{-1}$ at the impregnation temperature of at least 2.0, more preferably at least 2.5, most preferably at least 5. Moreover, the higher the viscosity ratio the higher the ratio of total separator thickness to porous web thickness that can be tolerated without prohibitive waviness. Reduced cockling enables more compact electrolytic cells to be realized. The viscosity ratio can be increased by using an inorganic pigment or a polymer as thickener.

It has also been found that the smoothness of the ion-permeable web-reinforced separators is not determined by the dope-viscosity and in principally determined by smoothness of the lower lips of the impregnating heads. Smoothness provides homogeneity in separator properties and avoidance of gas leakage through the separator.

Ion-permeable Reinforced Separator

According to a first aspect of the present invention an ion-permeable reinforced separator is provided, comprising at least one separator element and a substantially hollow by-pass channel contiguous with said at least one separator element, wherein said at least one separator element comprises a binder and a metal oxide or hydroxide dispersed therein and said separator element has a bubble point of at least 1 bar (0.1 MPa) and a back-wash resistance of at least 1 bar (0.1 MPa).

According to a preferred embodiment of the first aspect of the present invention, the reinforcement is realised with a reinforcement means selected from the group consisting of a web (e.g. a non-woven, woven or knitted fabric), a grid, wire mesh and a perforated (e.g. multiwall) plate, with a laminated or perforated multiwall plate being preferred. Examples of unperforated laminated multiwall sheets are disclosed in EP 1215037A and of unperforated extruded multiwall sheets are disclosed in EP 1506249A.

According to another preferred embodiment of the first aspect of the present invention, the ion permeable reinforced separator is a web-reinforced separator.

According to another preferred embodiment of all aspects of the present invention, the separator comprises two separator elements.

According to another preferred embodiment of all aspects of the present invention, the separator comprises at least two substantially hollow by-pass channels.

According to another preferred embodiment of the first aspect of the present invention, the separator comprises two separator elements and the reinforced separator is a web-reinforced separator configured such that the separator elements are spaced apart by a spacer between the two separator elements and/or they are tied together and spaced apart at a pressure-independent distance.

According to another preferred embodiment of the first aspect of the present invention, the separator elements have a specific resistance of less than 4 Ω-cm at 30° C. in 6M potassium hydroxide solution.

According to another preferred embodiment of the first aspect of the present invention, the separator elements have a pore size in the range of 0.05 to 0.50 μm.

According to another preferred embodiment of the first aspect of the present invention, the substantially hollow by-pass channel is integrated in said ion-permeable reinforced separator.

According to another preferred embodiment of the first aspect of the present invention, the separator is cylindrical.

According to another preferred embodiment of the first aspect of the present invention, the at least one separator and the hollow by-pass channel are non-separably linked with one another.

According to another preferred embodiment of all aspects of the present invention, the thickness of the at least one separator is at least 1 mm.

According to another preferred embodiment of all aspects of the present invention, the thickness of the at least one separator is at most 8 mm, with at most 5 mm being preferred.

According to another preferred embodiment of all aspects of the present invention, the height of the substantially hollow by-pass channel is at least 0.6 mm.

According to another preferred embodiment of all aspects of the present invention, the height of the substantially hollow by-pass channel is at most 8 mm, with at most 5 mm being preferred.

Figure 9:
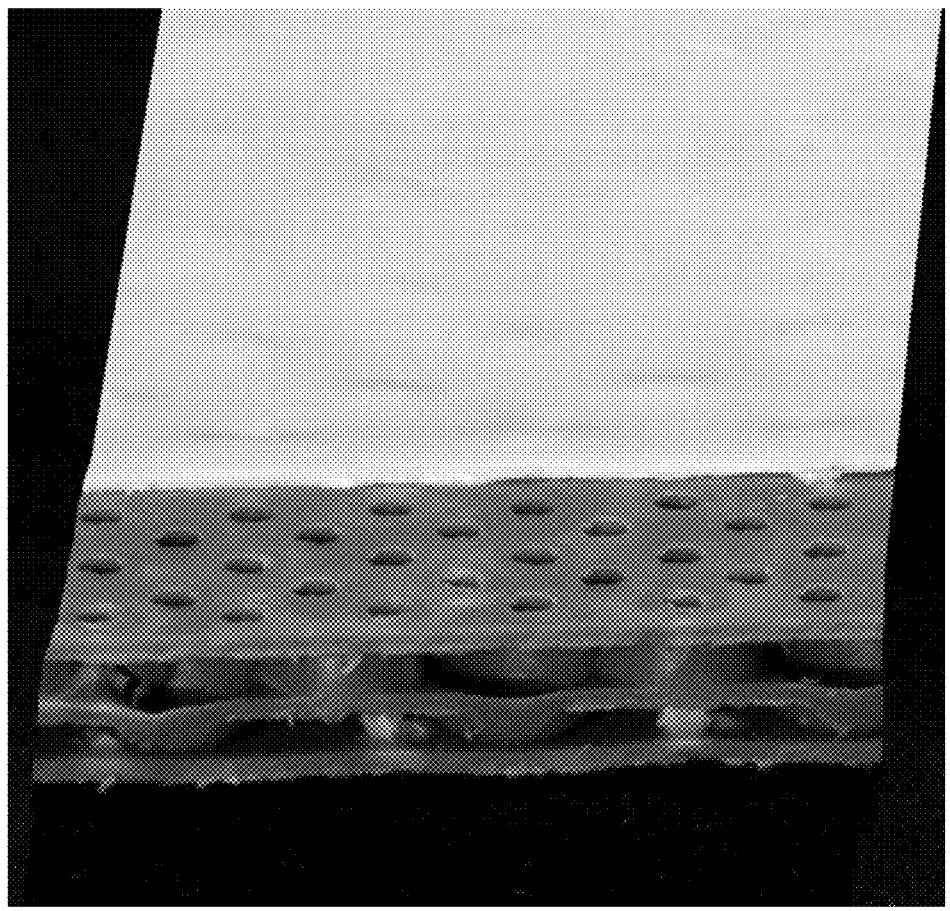
FIG. 9 shows a cross-sectional image of a three perforated plates laminated together with spacers between the plates to form a trilaminate which is shown with a portion coated with an ion-permeable layer (white layer) both on the uppermost perforated plate and on the bottommost perforated plate so as to form an e-by-pass separator consisting of two separator element sandwiching two contiguous non-separable substantially hollow by-pass channels, according to the present invention.

FIG. 9 shows a cross-sectional image of three perforated plates laminated together with spacers between the plates to form a trilaminate which is shown with a portion coated with an ion-permeable layer (white layer) both on the uppermost perforated plate and on the bottommost perforated plate so as to form an e-by-pass separator consisting of two separator element sandwiching two contiguous non-separable substantially hollow by-pass channels, according to the present invention. The uppermost layer in the figure is a first separator element and below the separator element are two substantially hollow by-pass channels with spacers perpendicular to the plane of the separator element laminating the porous plates together to form the channels. The bottommost layer coated on the bottommost porous plate (not visible) being a second separator element.

Figure 11:
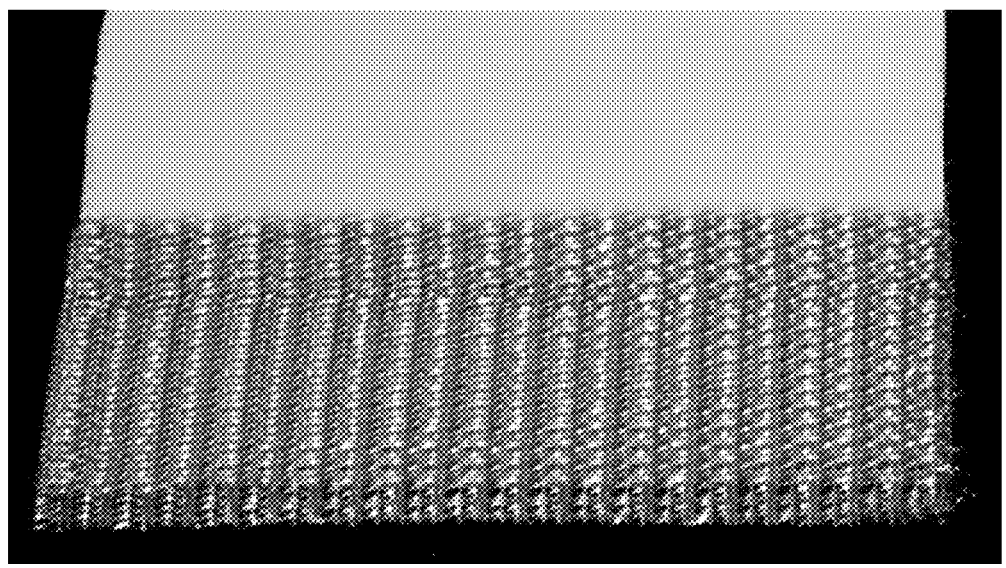
FIG. 11 shows a cross-sectional image of a woven spacer fabric with two faces woven together so as to form a substantially hollow channel between the faces, which is shown with a portion coated with an ion-permeable layer (white layer) both on the uppermost face and the bottommost face so as to form an e-by-pass separator consisting of two separator element sandwiching a contiguous non-separable substantially hollow by-pass channel, according to the present invention, which is used in the invention examples.

FIG. 11 shows a cross-sectional image of a woven spacer fabric with two faces woven together so as to form a substantially hollow channel between the faces, which is shown with a portion coated with an ion-permeable layer (white layer) both on the uppermost face and the bottommost face so as to form an e-by-pass separator consisting of two separator element sandwiching a contiguous non-separable substantially hollow by-pass channel, according to the present invention, which is used in the invention examples. The shape of the woven fabric is clearly visible with the multiple channel openings interspersed with monofilament fibres which prevent the channel collapsing. This is visible at the bottom of the figure and the line of the channel elements is clearly visible. One separator element is coated on the uppermost face of the woven fabric is clearly visible as a white layer. The other separator element (not visible) is coated on the bottommost face of the woven fabric.

Ion-permeable Web-reinforced Separator

According to a preferred embodiments of the first aspect of the present invention, an ion-permeable web-reinforced separator is provided comprising at least one separator element and a substantially hollow (by pass) channel contiguous with the at least one separator element, the at least one separator element comprising a binder and metal oxide, hydroxide, phosphate or titanate dispersed therein and the separator elements having a specific resistance less than 4 Ω-cm at 30° C. in 6M aqueous potassium hydroxide solution.

Figure 8:
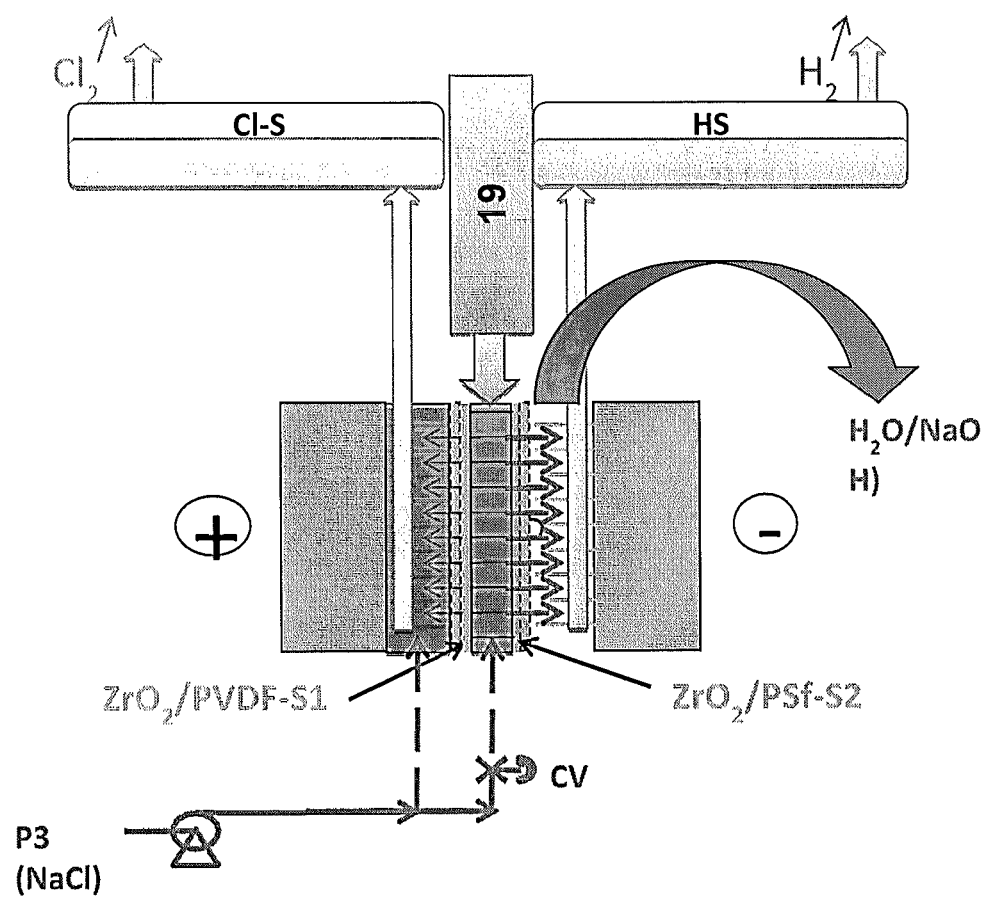
FIG. 8 is a schematic representation of a chlor-alkali electrolyser equipped with an adapted e-by-pass separator, 19. The $ZrO_2$/PVDF separator element S1 is directed to the anode side of the electrolyser; the $ZrO_2$/PSf separator element S2 to the cathode side of the electrolyser. A single brine electrolyte pump, P3, is used to feed both the anode compartment and the e-by-pass separator. The flow of brine from through the $ZrO_2$/PSf side of the e-by-pass separator, to prevent hydroxyl-ion back diffusion, is controlled by a control valve, CV. The diluted caustic soda ($H_2O$/NaOH) is collected on the cathode side.

According to an eleventh aspect of the present invention an ion-permeable web-reinforced separator is provided, said ion-permeable web-reinforced separator comprising two separator elements separated by an optionally integrated substantially hollow (by pass) channel, wherein the separator elements each comprise a binder and a metal oxide, hydroxide, phosphate or titanate dispersed therein and the separator elements have a specific resistance less than 4 Ω-cm at 30° C. in 6M aqueous potassium hydroxide solution and a back-wash resistance of at least 1 bar. The two separator elements may be the same or different e.g. having different compositions. For example one separator could be web-reinforced porous zirconia/polysulphone and the other could be web-reinforced porous zirconia/PVDF. An application requiring such a configuration is a chlor-alkali cell in which the porous zirconia/PVDF separator element is directed to the anode side of the cell where chlorine is produced and the porous zirconia/polysulphone separator element is directed to the cathode side of the cell where hydrogen is evolved with the saturated brine solution being fed from the internal by-pass channel and forced to flow through the complete surface of the zirconia/polysulphone-side of the e-by-pass separator towards the cathode compartment (by using a small overpressure), the polysulphone-based separator element is thereby never in contact with the chlorine gas and the PVDF-based separator element is never in contact with the sodium hydroxide solution, as shown in FIG. 8.

In the case of the embodiment with an integrated substantially hollow (by-pass) channel the two separator elements are tied together and spaced-apart by a 3D spacer fabric to which the separator material is applied. Between the two separator elements is an integrated substantially hollow (by-pass) channel, which can be filled with electrolyte and through which this electrolyte can flow. This special separator structure is obtained by impregnating the two outer layers of a 3D spacer fabric with a dope, which may be the same or different for the two outer layers. Furthermore, the at least one mineral in the dope applied to the two outer layers may be the same or different and the at least one binder in the dope applied to the different outer layers may be the same or different. For example ZIRFON® organomineral separator material may be separator material. This internal electrolyte channel can be used for creating an electrolyte circulation by-pass stream, between and through the two adjacent separator elements. In this by-pass, the electrolyte which is free from dissolved gases, will be forced to flow through the complete surface of the two separator elements. In this way the hydrogen gas that is dissolved in the catholyte compartment as a consequence of pressure is completely prevented from diffusing to the anolyte compartment. As a result of this method of operation the purity of the gases is independent of the operational conditions such as current density, pressure and temperature.

A example of an ion-permeable web-reinforced separator, according to a preferred embodiment of the first and sixth aspects of the present invention, in which the separator material in the two separator elements is different is one obtained by impregnating one of the two outer layers of e.g. a PPS (Ryton) 3D spacer fabric with a Zirfon (=$ZrO_2$/PSf/NMP) organo-mineral dope for making a ZrO2/PSf separator element, the other with a $ZrO_2$/PVDF/NMP organomineral dope for making a $ZrO_2$/PVDF separator element, and then phase-inverting the two dopes to provide 2 different separator elements i.e. dosing the dopes so that the volume between the two outer layers is not filled. The resulting internal electrolyte channel is used for creating an electrolyte circulation by-pass stream, between and through the two different separator elements, as shown in FIG. 8.

The larger thickness of the e-by-pass separator compared with the thickness of a single separator element will not result in a dramatic increase of the ohmic resistance because the distance between the two separator elements can be kept below 1 mm, and both the porosity of the separator elements as well as the space between them will be filled with electrolyte free of gas bubbles and dissolved gas e.g. pure lye.

According to a preferred embodiment of the first and sixth aspects of the present invention, the separation of the two separation elements is pressure independent.

According to a preferred embodiment of the first and sixth aspects of the present invention, the separator elements have a bubble point of at least 1 bar (0.1 MPa).

According to a preferred embodiment of the first and sixth aspects of the present invention, the ion permeable web-reinforced separator is configured such that they are spaced apart by a spacer between the two separator elements and/or they are tied together and spaced apart at a pressure-independent distance.

According to preferred embodiment of the first and sixth aspects of the present invention, the separator elements have a specific resistance of less than 4 Ω-cm at 30° C. in 6M potassium hydroxide solution.

According to a preferred embodiment of the first and sixth aspects of the present invention, the separator elements have a pore size in the range of 0.05 to 0.50 μm.

According to a preferred embodiment of the first and sixth aspects of the present invention, the substantially hollow (by-pass) channel is, integrated in said ion-permeable web-reinforced separator.

According to a preferred embodiment of the first and sixth aspects of the present invention, the web reinforcement is provided by a polyphenylene sulphide (PPS) 3D spacer fabric.

According to a preferred embodiment of the first and sixths aspect of the present invention, the thickness of the ion-permeable web-reinforced separator is in the range of 0.5 to 7.0 mm.

According to a preferred embodiment of the first and sixth aspects of the present invention, the thickness of the separator elements is in the range of 200 μm to 2000 μm.

According to a preferred embodiment of the first and sixth aspects of the present invention, the height of the integrated substantially hollow (by-pass) channel is in the range of 400 μm to 6.5 mm, typically 1 mm, but must be sufficiently high to avoid pressure drop over the channel but not so high as to cause a substantial voltage penalty.

According to another preferred embodiment of the first and sixth aspects of the present invention, the bubble point of said separator elements is at least 3 bar (0.3 MPa, with greater than 5 bar (0.5 MPa) being preferred and greater than 10 bar (1 MPa) being particularly preferred.

According to another preferred embodiment of the first and sixth aspects of the present invention, the specific resistance of the separator elements at 30° C. in 6M aqueous potassium hydroxide solution is less than 4 Ω-cm and is typically 2.5 Ω-cm at 70° C.

According to another preferred embodiment of the first and sixth aspects of the present invention, the areal resistance of the separator elements at 30° C. in 6M aqueous potassium hydroxide solution is less than 1.0 Ω-cm$^2$, with a typical value of 0.2 Ω-cm$^2$ for 500 μm thick separators.

According to another preferred embodiment of the first and sixth aspects of the present invention the total pore volume of a separator element is in the range 50 to 80 vol % of the separator element.

According to another preferred embodiment of the first and sixth aspects of the present invention the electrolyte permeability at 70° C. is in the range of 50 to 1500 l/h m$^2$ bar [0.014 to 0.42 l/s.m$^2$.bar] reduced by a multiplication factor of the (viscosity of water at 20° C.)/(electrolyte viscosity at 70° C.). For example 6M aqueous potassium hydroxide solution has a viscosity at 70° C. substantially equal to that of water at 20° C. and hence the electrolyte permeability at 70° C. will be in the range of about 50 to about 1500 l/h m$^2$ bar [about 0.014 to about 0.42 l/s.m$^2$.bar], whereas 6M aqueous sodium hydroxide has a viscosity at 70° C. about double that of water at 20° C. and hence the electrolyte permeability will be in the range of about 25 to about 750 l/h m$^2$ bar [about 0.007 to about 0.21 l/s.m$^2$.bar].

According to another preferred embodiment of the first and sixth aspects of the present invention the electrolyte permeability of the separator elements and the dimensions of the substantially hollow (by pass) channel are such as to provide a flow rate through the substantially hollow (by pass) channel which is about a factor of five to about twenty higher than that through the separator elements, with a factor of about ten being preferred.

According to another preferred embodiment of the first and sixth aspects of the present invention the electrolyte permeability of the separator elements and the dimensions of the substantially hollow (by pass) channel are such as to provide a flow resistance through the substantially hollow (by-pass) channel which is about a factor of five to about a factor of twenty lower than that through the separator elements, with a factor of about ten being preferred.

Aqueous sodium hydroxide and aqueous potassium hydroxide are the alkaline electrolytes of choice with the peak of the conductivity dependence upon concentration increasing and shifting to higher concentrations upon increasing the cell operating temperature. For example in the case of aqueous sodium hydroxide a maximum conductivity at 18° C. of 0.36 Ω$^{-1}$ cm$^{-1}$ is realised at a concentration of ca. 12.5 wt % rising to 1.25 Ω$^{-1}$ cm$^{-1}$ at a concentration of 24 wt % at 40° C.; and in the case of aqueous potassium hydroxide a maximum conductivity at 20° C. of 0.57 Ω$^{-1}$ cm$^{-1}$ is realised at a concentration of ca. 26 wt % rising to 1.71 Ω$^{-1}$ cm$^{-1}$ at a concentration of 34 wt % at 100° C.

According to a preferred embodiment of the first and sixth aspects of the present invention, the ion-permeable web-reinforced separator is macroscopically flat at a tensile force of less than 100 N/m, the ion-permeable web-reinforced separator preferably having a crimp after 120 minutes at 100° C. of less than 10%, with a crimp of less than 5% being preferred. This enables compact stacking in electrochemical cells.

According to a preferred embodiment of the first and sixth aspects of the present invention, the ion-permeable web-reinforced separator is macroscopically flat at a tensile force of less than 100 N/m and the amplitude of the cockling of the ion-permeable web-reinforced separator is at most ten-times the thickness of the elongated porous web.

According to another preferred embodiment of the first and sixth aspects of the present invention, the ion-permeable web-reinforced separator is cylindrical (tubular). Cylindrical separator configurations are disclosed in US 2007/0151865A1, US 2010/0276299A1 and U.S. Pat. No. 7,510, 663 and these configurations are hereby incorporated by reference. In the case of the embodiment with an integrated substantially hollow (by-pass) channel tubular 3D spacer fabric is used to realise the integrated substantially hollow (by-pass) channel. This enables use in a high-pressure electrochemical cells e.g. high-pressure alkaline water hydrolysis cells or high pressure air fuel cells.

According to another preferred embodiment of the first and sixth aspects of the present invention, the ion-permeable web-reinforced separator has a ratio of total thickness to thickness of the elongated porous web of less than 2.1.

The production techniques disclosed in WO 2009/147084A1 and WO 2009/147086A1 with appropriate dosing of metal oxide or hydroxide-containing dope to the two sides of alkali-resistant 3D spacer fabrics provides flat sheet separators or cylindrical separators in which the faces of the spacer-fabric containing the multifilaments are used for anchoring the separator elements resulting from phase inversion of the impregnated dope on the two sides of the 3D spacer fabric leaving a hollow (by-pass) channel thereby realising an electrolyte channel between the two separator elements. This electrolyte channel can be used for transporting free electrolyte in between and through the separator elements. This feature can be used in electrolytic cells such as for alkaline water electrolysis and in air fuel cells.

Particular features of the preferred embodiment of the separator with an integrated substantially hollow (by pass) channel are: its rigidity and the superior adhesion of the two separator elements to the 3D spacer fabric rendering the two separator elements almost inseparable with a gap over the whole separator between the two separator elements, which enables an unhindered flow of electrolyte.

During the manufacturing process the right pore diameter has to be realized (in the MF or UF region) as well, and this at both separator elements at the same time. This is done by a combination of vapour (VIPS) and liquid induced phase separation (LIPS). It is obvious that this development was a real technological challenge.

Such separators can be used for continuous wetting of the separator elements during electrolysis with gas evolution; washing off the corrosion product depositions from the separator elements originating from catalyst piping material (by back-washing with filtered and degassed electrolyte); for cooling purposes (particularly for alkaline fuel cells); for assisting the evacuation of the evolved gases from both anolyte and catholyte compartments with a resulting improvement in gas quality thereby enabling an alkaline water electrolyser to operate at 5% to 120% and for very high pressure electrolysis from 100 to 800 bar (10 to 80 MPa); and equalisation of both anolyte and catholyte concentrations. This novel separator concept enables the generation of electrolyte by-pass streams. These by-pass separators can be used for many types of electrochemical cell involving the production or consumption of at least one gas e.g. hydrogen, oxygen, ammonia or methanol vapour. By varying the composition of the separator elements and the 3D spacer fabric used separators according to the present invention can be realised which can be used in fuel cells with alkaline or acidic electrolytes and electrolytic cells with alkaline and acidic electrolytes with different electrodes and catalysts and also at elevated temperatures. A type of Zirfon®PERL separator is, for example, offered by AGFA for cells operating at 80° C.

Use of the Ion-permeable Reinforced Separator in an Electrochemical Cell Involving the Production or Consumption of at Least One Gas According to a second aspect of the present invention the use is provided of the ion-permeable reinforced separator of the first aspect of the present invention in electrochemical cells involving the production or consumption of at least one gas.

According to a preferred embodiment of the second aspect of the present invention, the separator is a web-reinforced separator.

According to another preferred embodiment of the second aspect of the present invention, the electrochemical cells are high-pressure electrochemical cells.

According to another preferred embodiment of the second aspect of the present invention, the electrochemical cell is an electrolytic cell, preferably an alkaline water electrolysis cell.

According to another preferred embodiment of the second aspect of the present invention, the electrochemical cell is a fuel cell, preferably an alkaline fuel cell.

According to another preferred embodiment of the second aspect of the present invention, the electrochemical cell is a fuel cell and the fuel cell comprises an anodic compartment, a cathodic compartment and a barrier compartment.

According to another preferred embodiment of the second aspect of the present invention the resistance to flow of electrolyte through the substantially hollow (by-pass) channel is at least a factor of ten lower than that through the separator elements, with a factor of twenty lower being preferred and a factor of fifty lower being particularly preferred.

According to another preferred embodiment of the second aspect of the present invention the resistance to flow of electrolyte through the substantially hollow (by pass) channel is at most a factor of one thousand lower than that through the separator elements.

According to another preferred embodiment of the second aspect of the present invention the pressure governing the flow of electrolyte through the substantially hollow (by-pass) channel is at least 50 mbar lower than the pressure governing the flow of electrolyte through the separator elements.

Use of the Ion-permeable Web-reinforced Separator in an Electrochemical Cell Involving the Production or Consumption of at Least One Gas According to a seventh aspect of the present invention, use is provided of the ion-permeable web-reinforced separator of the sixth aspect of the present invention in electrochemical cells involving the production or consumption of at least one gas and in particular in high-pressure electrochemical cells.

According to a preferred embodiment of the seventh aspect of the present invention, the electrochemical cell is a three compartment electrochemical cell comprising an anodic compartment, a cathodic compartment and a barrier compartment.

According to another preferred embodiment of the seventh aspect of the present invention, the electrochemical cell is an electrolytic cell, preferably an alkaline water electrolysis cell. According to another preferred embodiment of the seventh aspect of the present invention, the electrochemical cell is an electrolytic cell and the electrolytic cell comprises an anodic compartment, a cathodic compartment and a barrier compartment.

According to another preferred embodiment of the seventh aspect of the present invention, the electrochemical cell is a fuel cell, preferably an alkaline fuel cell.

According to another preferred embodiment of the seventh aspect of the present invention, the electrochemical cell is a fuel cell and the fuel cell comprises an anodic compartment, a cathodic compartment and a barrier compartment.

According to another preferred embodiment of the seventh aspect of the present invention the resistance to flow of electrolyte through the substantially hollow (by-pass) channel is at least a factor of ten lower than that through the separator elements, with a factor of twenty lower being preferred and a factor of fifty lower being particularly preferred.

According to another preferred embodiment of the seventh aspect of the present invention the resistance to flow of electrolyte through the substantially hollow (by-pass) channel is at most a factor of one thousand lower than that through the separator elements.

According to another preferred embodiment of the seventh aspect of the present invention the pressure governing the flow of electrolyte through the substantially hollow (by-pass) channel is at least 50 mbar lower than the pressure governing the flow of electrolyte through the separator elements.

Electrochemical Cell

According to a third aspect of the present invention an electrochemical cell is provided involving the production or consumption of at least one gas, said electrochemical cell comprising the ion-permeable reinforced separator of the first aspect of the present invention. Examples of electrochemical cells involving the production or consumption of at least one gas are electrochemical cells for the production of chemical compounds by means of an electrocatalytic reaction, electrolytic cells and fuel cells. According to a eighth aspect of the present invention an electrochemical cell involving the production or consumption of at least one gas is provided, said electrochemical cell comprising the ion-permeable web-reinforced separator of the sixth aspect of the present invention. Examples of electrochemical cells involving the production or consumption of at least one gas are electrochemical cells for the production of chemical compounds by means of an electrocatalytic reaction, electrolytic cells and fuel cells.

According to a preferred aspect of the third and eighth aspects of the present invention, the electrochemical cell is an electrochemical cell for the production of at least one chemical compound by means of an electrocatalytic reaction, with said at least one chemical compound being preferably a gas.

According to a preferred aspect of the third and eighth aspects of the present invention, the electrochemical cell is an electrolytic cell, the electrolytic cell being preferably an alkaline water electrolysis cell.

According to a preferred aspect of the third and eighth aspects of the present invention, the electrochemical cell is a fuel cell, preferably an alkaline fuel cell.

According to a preferred embodiment of the electrochemical cell according to the third and eighth aspects of the present invention, the electrochemical cell is provided with at least one pump to provide circulation of electrolyte therein e.g. through the anolyte compartment, the catholyte compartment and the separator.

According to a preferred embodiment of the electrochemical cell according to the third and eighth aspects of the present invention, the electrochemical cell is provided with two pumps to provide circulation of electrolyte therein e.g. through the anolyte compartment, the catholyte compartment and the separator.

According to a preferred embodiment of the electrochemical cell according to the third and eighth aspects of the present invention, the electrochemical cell is provided with three pumps to provide circulation of electrolyte therein e.g. through the anolyte compartment, the catholyte compartment and the separator.

Electrochemical Cells for the Production of Chemical Compounds

According to a preferred embodiment of the third and eighth aspects of the present invention, said electrochemical cell involving the production or consumption of at least one gas is an electrochemical cell for the production of at least one chemical compound by means of an electrocatalytic reaction. The at least one chemical compound may be a gas, a liquid or a solid in solution. The use of the e-bypass separator in the electrochemical cell instead of the conventional approach of a liquid electrolyte chamber together with an ion-conducting/permeable membrane has the advantages of: reduced distance between anode and cathode when compared to a cell with an electrolyte chamber, which results in lower resistance and lower power losses; and a double barrier for gases, the integration of the e-bypass separator provides a barrier for gaseous reactants and products from both anode and cathode. This configuration can be used in electrochemical cells for the production of other chemicals, where the reactants are gases but products are liquids or solids soluble in aqueous electrolyte and where the reactant is at least one liquid or solids soluble in aqueous electrolyte and the products are gases.

An example of such an electrochemical process according to the third and eighth aspects of the present invention in which the reactants are gases is the production of hydroxylamine (HA) from hydrogen and nitric oxide. Industrial production of hydroxylamine is carried out by reduction of the higher oxidation states of nitrogen, see for example U.S. Pat. No. 5,554,353. By using an appropriate cell configuration it is possible to hydrogenate NO with $H_2$ and produce hydroxylamine (or its conjugated acid hydroxylammonium) with electrical current being produced as a by-product. The fuel cell reaction is in this case:

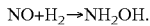

The cell consists of an anode and a cathode (to which hydrogen and nitrogen oxide are fed respectively) separated by a free electrolyte liquid phase, U.S. Pat. No. 4,321,313, on the other hand, does not contemplate the use of a separator/membrane between anode and cathode. At the anode hydrogen is oxidized to produce protons and electrons (anode half-reaction: $H_2 \rightarrow 2\ H^+ + 2\ e^-$). At the cathode nitric oxide is reduced to yield hydroxylamine (cathode half reaction: $2\ NO + 6\ H^+ + 6\ e^- \rightarrow 2\ NH_2OH$). The presence of liquid electrolyte 3M sulfuric acid is mandatory in this device because the sulfuric acid has the additional function of reacting with the hydroxylamine produced to produce hydroxylammonium sulfate (HAS):

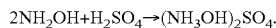

Hydroxylammonium sulfate salt is much more stable and easier to handle than hydroxylamine free base, which is fairly prone to violent decomposition. A proton conducting membrane is additionally placed in the electrolyte between anode and cathode in order to prevent crossover of reagents and products. However, the hydroxylammonium product being an ion, the ion conducting membrane is not an adequate barrier to prevent HAS from migrating to the electrode surface, where it can further react hampering the efficiency of the system. The e-bypass separator provides a means of trapping the HA product by reaction with sulfuric acid and of removing the resulting HAS from the proximity of the electrode surface.

An example of such an electrochemical process according to the third and eighth aspects of the present invention in which the products are gases is chlor-alkali electrolysis in which chloride ions are oxidized at the anode to produce chlorine and water is split into hydroxide ions and hydrogen at the cathode. In conventional cells a separator or diaphragm prevents the reaction of the sodium hydroxide and chlorine co-products, whereas in the electrochemical cell according to the third and eighth aspects electrolyte free from gas flows through the channel of the by-pass separator between the two separator layers. This configuration has the additional advantages of a much lower cell resistance and a much better hydrophilicity resulting in an increased cell efficiency.

Electrolytic Cells

According to a preferred embodiment of the third and eighth aspects of the present invention, said electrochemical cell involving the production or consumption of at least one gas is an electrolytic cell, preferably a water electrolysis cell and particularly preferably an alkaline water electrolysis cell.

Acidic water electrolysis requires the use of precious metal catalysts, whereas alkaline water electrolysis enables the use of non-noble metal catalysts. However, alkaline water electrolysers show low energy efficiency because of the high overvoltage of the oxygen evolving anodes. To decrease the activation overvoltage, numerous electrocatalysts have been suggested including transition metals oxide, with spinel-type structures and transition metals alloys being most promising for oxygen evolution and hydrogen evolution electrode catalysts respectively.

Figure 2:
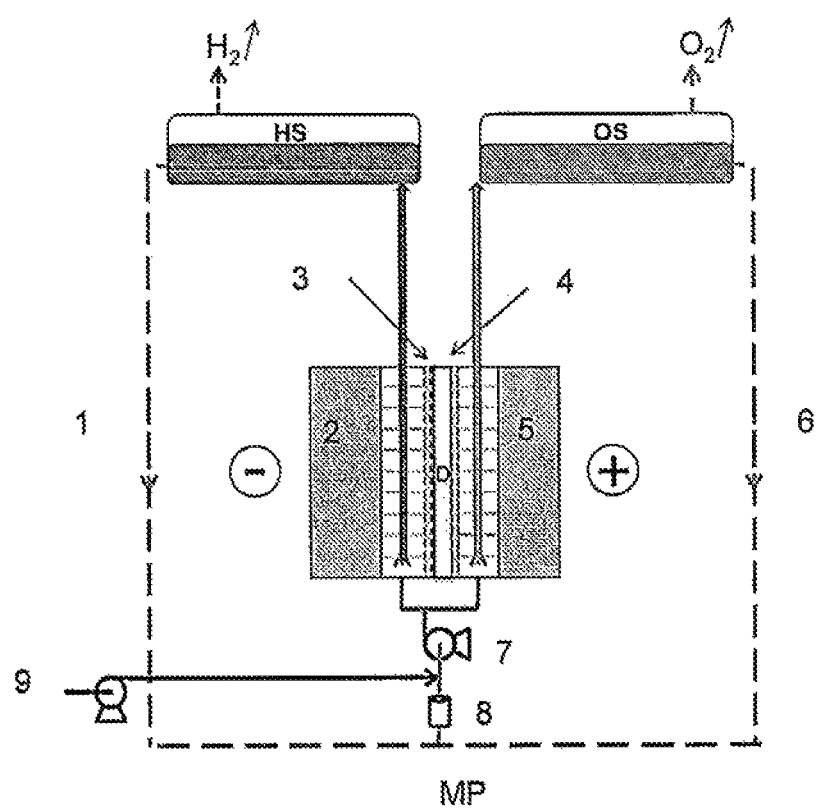
FIG. 2 is a schematic representation of a prior art electrolyser with a single-pump (7) system, the two separator elements in contact with the catholyte and anolyte respectively and a diaphragm D between the catholyte and anolyte compartments, which cannot prevent diffusion of hydrogen to the anolyte compartment and oxygen to the catholyte compartment.

FIG. 2 is a schematic representation of a prior art electrolyser with a single-pump system, the two separator elements in contact with the catholyte and anolyte respectively and a diaphragm, D, between the catholyte and anolyte compartments, which cannot prevent diffusion of hydrogen to the anolyte compartment and oxygen to the catholyte compartment. There is circulation of the completely degassed catholyte (1) and anolyte. (6).

Figure 3:
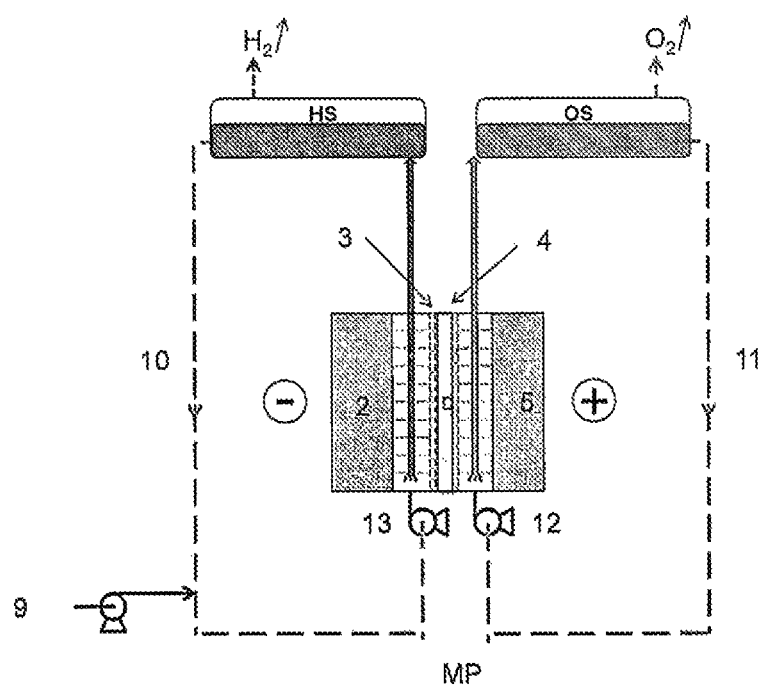
FIG. 3 is a schematic representation of a prior art electrolyser with a two-pump (12, 13) system with the two separator elements in contact with the catholyte and anolyte respectively and in which one pump pumps partially degassed electrolyte, 10, into the catholyte and the other pump pumps partially degassed electrolyte, 11, into the anolyte and there is a diaphragm, D, between the catholyte and anolyte compartments, which cannot prevent diffusion of hydrogen to the anolyte compartment and oxygen to the catholyte compartment.

FIG. 3 is a schematic representation of a prior art electrolyser a with two-pump (12, 13) system with the two separator elements in contact with the catholyte and anolyte respectively and in which one pump pumps partially degassed electrolyte, 10, into the catholyte and the other pump pumps partially degassed electrolyte, 11, into the anolyte and there is a diaphragm between the catholyte and anolyte compartments, which cannot prevent diffusion of hydrogen to the anolyte compartment and oxygen to the catholyte compartment. There is circulation of the partially degassed electrolyte (10, 11) in both the catholyte and anolyte compartments.

Figure 4:
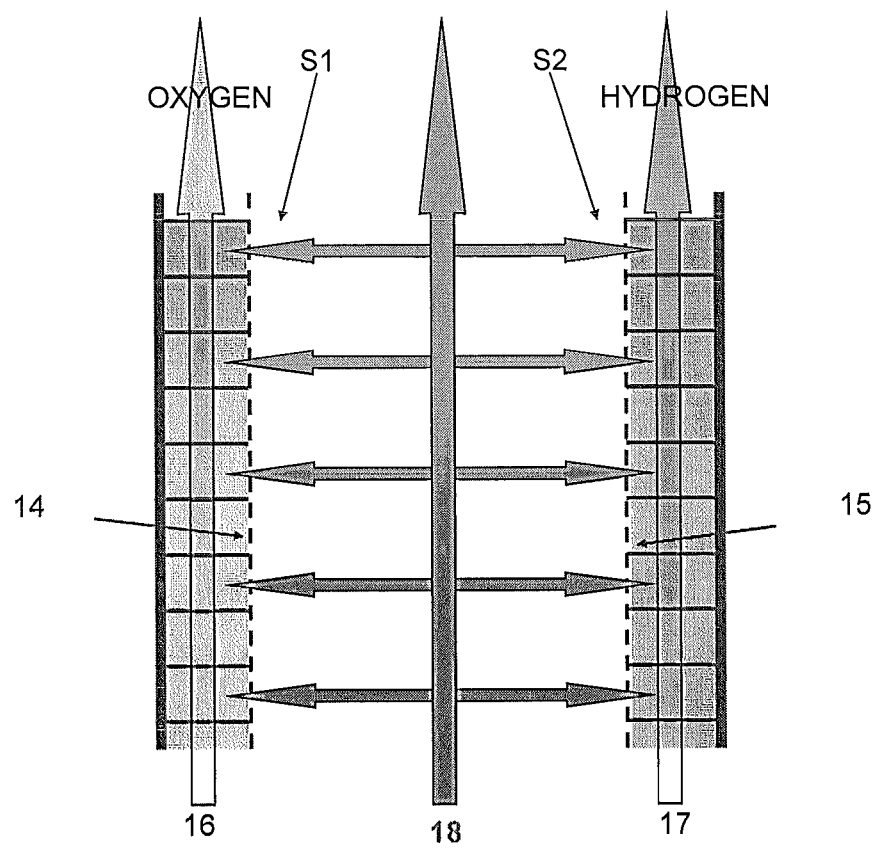
FIG. 4 is a schematic representation of an electrochemical cell with three electrolyte circulation circuits, 16 (first), 17 (second) and 18 (third), in which the anode and cathode each with an electrolyte circuit is separated by an e-by-pass separator, 19, according to the present invention, in which electrolyte flows both through the substantially hollow by-pass channel between the two separator elements, S1 and S2, and through the separator elements, S1 and S2, themselves.

FIG. 4 is a schematic representation of an electrochemical cell with three electrolyte circulation circuits, 16 (first), 17 (second) and 18 (third), in which the anode and cathode each with an electrolyte circuit is separated by an e-by-pass separator, according to the present invention, in which electrolyte is circulated though the electrolyte channel between the two separator elements, S1 and S2.

If this third electrolyte circuit, 18, operates with a higher pressure than in the anolyte and catholyte circuits, it enables the pores of the separator elements to be wetted continuously by an independent flow of electrolyte (the third circuit) across them, which is essential for the good functioning of the separator in all circumstances (i.e. at both low and high current densities). Moreover, this independent flow of electrolyte does not contain any dissolved gases and displaces, and hence thereby removes, continuously the gasses produced in the anolyte and catholyte circuits respectively which penetrate into the separator elements on the two sides of the interposed channel. In addition this independent flow of electrolyte rinses continuously the deposition products resulting from corrosion of piping from the separator (by a back-washing of the separator). This ensures a low long-term separator resistance. As a result the cell voltage is expected to remain low, even at high current densities. This also applies for large electrode areas in high power electrolysers. A further advantage of a third electrolyte circuit, 18, is that equalisation of the concentration of the electrolyte in the anolyte and catholyte is facilitated because they are mixed just after they leave the gas separators and just before they enter the third (barrier) compartment, which leads to a slightly reduced cell voltage, since the electrolyte conductance is highest.

Specifically in the case of high pressure electrolysers, another advantage of the e-by-pass separator with respect to a conventional separator is the possibility of producing superior gas qualities (both hydrogen and oxygen), since diffusion of gases to the other compartment will be highly limited by the convective flow as a result of the third electrolyte circuit. This improvement is especially necessary for high pressure electrolysers operated in a wide current density range: In a commercial electrolyser operated at 30 bar (3 MPa), current densities below 3 kA/m$^2$ impair the hydrogen purity. Moreover, the contamination percentage of hydrogen in oxygen starts approaching the lower explosive limit (LEL). At even higher electrolyser pressures the solubility of gases in aqueous potassium hydroxide (lye) increases and the mixing of the gases will approach the LEL. It is therefore essential to address the problem of gas purity when operating an electrolyser at 150 bar (15 MPa] in a wide operating range. The first and sixth aspects of the present invention provide a solution to this problem. By using the middle electrolyte stream and applying differential pressures in such a way that electrolyte is transported from the middle through the diaphragms towards the anode and cathode compartment, diffusion of gases through the electrolyte becomes negligible.

Figure 5:
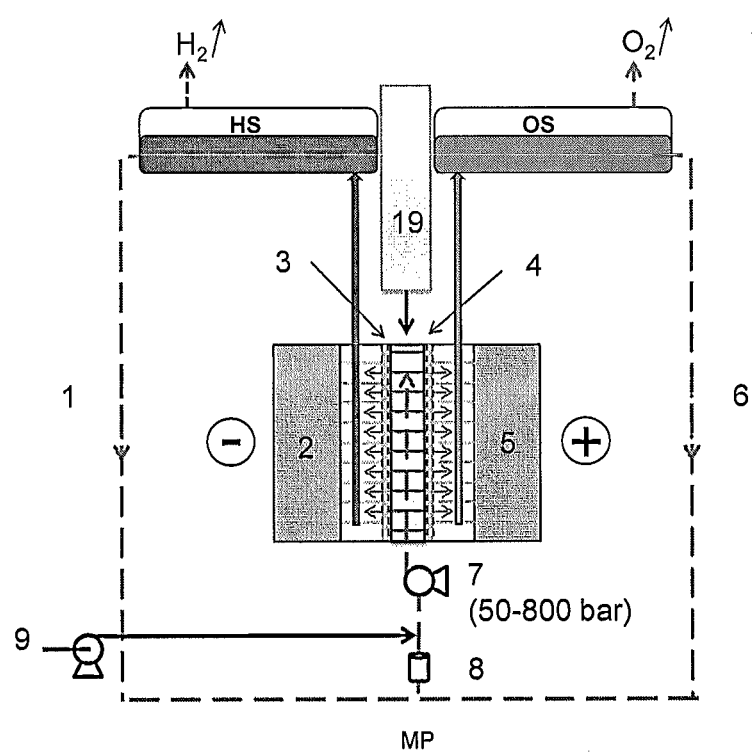
FIG. 5 is a schematic representation of an electrolyser with an e-by-pass separator, 19, and a single electrolyte pump, 7, incorporating the e-by-pass separator, 19, according to the present invention with the two separator elements in contact with the catholyte and anolyte respectively and in which electrolyte is pumped by the single pump, 7, through the substantially hollow by-pass channel and through the separator elements and then through the hydrogen and oxygen separators, HS and OS, to provide completely degassed catholyte (1) and anolyte (6) respectively which is then returned after filtering (8) to remove particulate matter e.g. corrosion products or catalyst particles before pumping through the substantially hollow by-pass channel again

FIG. 5 is a schematic representation of an electrolyser with an e-by-pass separator, 19, and a single electrolyte pump, 7, incorporating the e-by-pass separator, 19, according to the present invention with the two separator elements, S1 and S2, in contact with the catholyte and anolyte respectively and in which electrolyte is pumped by the single pump, 7, through the substantially hollow (by-pass) channel and through the separator elements, S1 and S2, and then through the hydrogen and oxygen separators, HS and OS, to provide completely degassed catholyte and anolyte respectively which is then returned after filtering (8) to remove particulate matter e.g. corrosion products or catalyst particles before pumping through the substantially hollow (by-pass) channel again.

Figure 6:
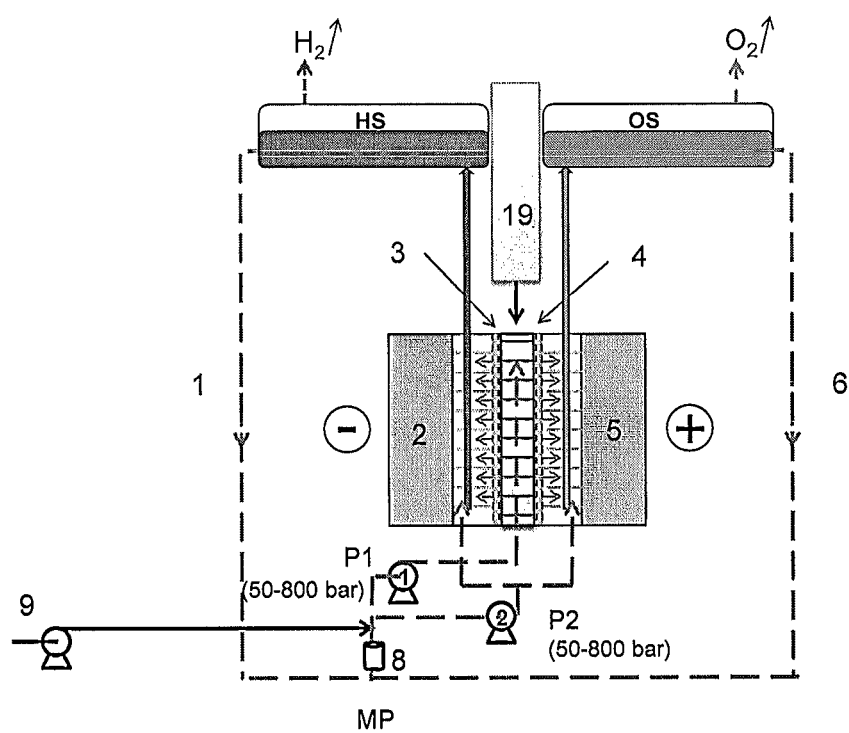
FIG. 6 is a schematic representation of an electrolyser with an e-by-pass separator, 19, and two electrolyte pumps, P1 and P2, incorporating the e-by-pass separator, 19, according to the present invention with the two separator elements in contact with the catholyte and anolyte respectively and in which electrolyte is pumped by the one pump, P1, through the substantially hollow by-pass channel and through the separator elements and then through the hydrogen and oxygen separators, HS and OS, to provide completely degassed catholyte and anolyte respectively which is then returned after filtering (8) to remove particulate matter e.g. corrosion products or catalyst particles before pumping through the substantially hollow by-pass channel again and a second pump, P2, pumping electrolyte into the catholyte and anolyte compartments.
Figure 7:
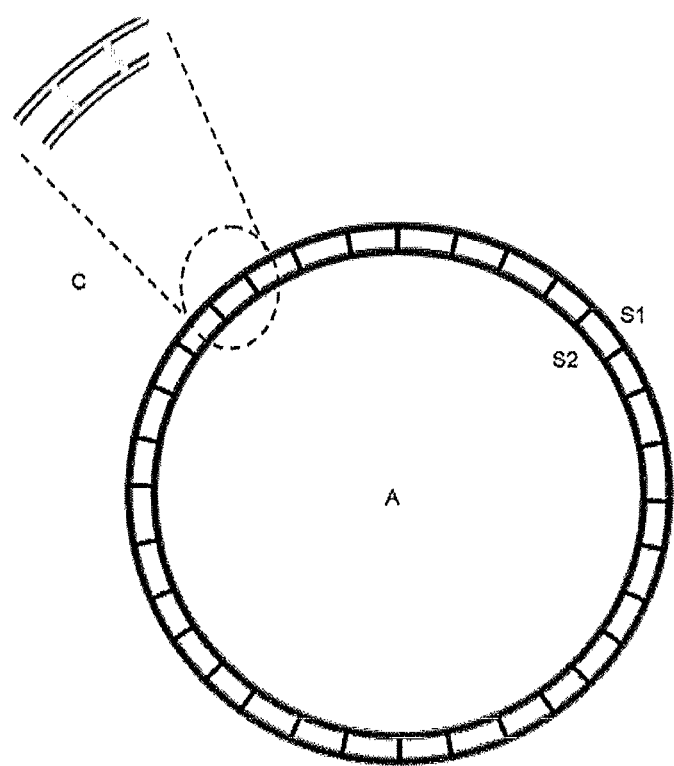
FIG. 7 is a schematic view of an e-by-pass cylindrical separator according to the present invention with the two separator elements, S1 and S2, in contact with the catholyte and anolyte respectively with a substantially hollow by-pass channel in between them.

FIG. 6 is a schematic representation of an electrolyser with an e-by-pass separator, 19, and two electrolyte pumps, P1 and P2, incorporating the e-by-pass separator, 19, according to the present invention with the two separator elements, S1 and S2, in contact with the catholyte and anolyte respectively and in which electrolyte is pumped by the one pump, P1, through the substantially hollow (by-pass) channel and through the separator elements, S1 and S2, and then through the hydrogen and oxygen separators, HS and OS, to provide completely degassed catholyte and anolyte respectively which is then returned after filtering (8) to remove particulate matter e.g. corrosion products or catalyst particles before pumping through the substantially hollow (by-pass) channel again and a second pump, P2, pumping electrolyte into the catholyte and anolyte compartments.

The larger thickness of the separator of the present invention compared with that of a single element separator will not result in a dramatic increase of the ohmic resistance because the distance between the two separator elements can be kept below 1 mm, and both the pores of the separator elements as well as the space between them will be filled with lye.

Fuel Cells

According to another preferred embodiment of the third and eighth aspects of the present invention, said electrochemical cell is a fuel cell, preferably an alkaline fuel cell (AFC). In a fuel cell air and hydrogen are fed in and water and electricity are produced. The electrolyte may be strongly alkaline e.g. a solution of potassium hydroxide, as in AFC's or acidic as in phosphoric acid fuel cells (PAFC's) and PEMFC's.

In an alkaline fuel cell, as a result of the poisoning effect of the carbon dioxide in air, there are two main variants of alkaline fuel cells: those with static electrolyte and those with flowing electrolyte. Static, or immobilized, electrolyte cells of the type used in the Apollo space craft and the Space Shuttle typically use an asbestos separator saturated in potassium hydroxide. Water production is managed by evaporation from the anode, which produces pure water that may be reclaimed for other uses. These fuel cells typically use platinum catalysts to achieve maximum volumetric and specific efficiencies. Flowing electrolyte designs use a more open matrix that allows the electrolyte to flow either between the electrodes (parallel to the electrodes) or through the electrodes in a transverse direction (the ASK-type or EloFlux fuel cell). In parallel-flow electrolyte designs, the water produced is retained in the electrolyte, and the old electrolyte may be exchanged for fresh. In the case of "parallel flow" designs, greater space is required between the electrodes to enable this flow, and this translates into an increase in cell resistance, decreasing power output compared to immobilized electrolyte designs. Further variations on the alkaline fuel cell include the metal hydride fuel cell and the direct borohydride fuel cell. The alkaline liquid electrolyte typically a potassium hydroxide solution, the presence of the hydroxyl ions travelling across the electrolyte allowing a circuit to be made and electrical energy to be produced. A standard fuel cell electrode for liquid electrolyte consists of several PTFE-bonded carbon black layers. Typical current collectors consist of nickel. A catalyst for anodes is Raney-nickel. However, the use of noble metals for cathodes (Pt) and anodes (Pd, Pt, Ru, Rh) is still common because the number of AFC systems produced is low.

A Method for Producing Hydrogen in an Electrolytic Cell

According to a fourth aspect of the present invention a method is provided for producing hydrogen in an electrolytic cell, wherein said alkaline water electrolysis cell comprises an ion-permeable reinforced separator of the first aspect of the present invention and electrolyte fills and flows through said substantially hollow (by-pass) channel between and through said separator elements. This flow through the substantially hollow (by-pass) channel cools the separator.

According to a ninth aspect of the present invention a method is provided for producing hydrogen in an electrolytic cell, wherein the electrolytic cell comprises the ion-permeable web-reinforced separator of the sixth aspect of the present invention and electrolyte fills and optionally flows through the (optionally integrated) substantially hollow (by-pass) channel between the separator elements. This flow through the substantially hollow (by-pass) channel cools the separator.

According to a preferred embodiment of the fourth and ninth aspects of the present invention, the electrolytic cell is an alkaline water electrolysis cell.

According to a preferred embodiment of the fourth and ninth aspects of the present invention, the flow rate of electrolyte through the separator elements is at least 1 l/h m$^2$ [0.28 mL/s.m$^2$], with a flow rate of at least 15 l/h m$^2$ [4.2 mL/s.m$^2$] being preferred. According to a preferred embodiment of the fourth and ninth aspects of the present invention, the flow rate of electrolyte through the separator elements is at most 1000 l/h m$^2$ [0.28 L/s.m$^2$], with a flow rate of at most 300 l/h m$^2$ [0.084 L/s.m$^2$] being preferred.

According to a preferred embodiment of the fourth and ninth aspects of the present invention, the velocity of the electrolyte flow through the (optionally integrated) hollow (by-pass) channel is at least 1 cm/s and preferably at least 10 cm/s.

A Process for Producing Electricity in a Fuel Cell

According to a fifth aspect of the present invention a process is provided for producing electricity in a fuel cell, wherein the fuel cell comprises the ion-permeable reinforced separator of the first aspect of the present invention and electrolyte fills and optionally flows through the (optionally integrated) substantially hollow (by-pass) channel between the separator elements.

According to a tenth aspect of the present invention a process is provided for producing electricity in a fuel cell, wherein the fuel cell comprises the ion-permeable web-reinforced separator of the sixth aspect of the present invention and electrolyte fills and optionally flows through the (optionally integrated) substantially hollow (by-pass) channel between the separator elements.

According to a preferred embodiment of the fifth and tenth aspects of the present invention, the fuel cell is an alkaline fuel cell.

According to a preferred embodiment of the fifth and tenth aspects of the present invention, the velocity of the electrolyte flow through the (optionally integrated) hollow (by-pass) channel is at least 1 cm/s and preferably at least 10 cm/s.

INDUSTRIAL APPLICATIONS

The ion-permeable web-reinforced separators, according to the present invention, can be used in electrochemical cells involving the production or consumption of gases, particularly in high-pressure electrochemical cells, and are particularly useful for alkaline fuel cells and for alkaline water electrolysis.

EXAMPLES

Fabrics Used in the EXAMPLES:

A FC 0360/50 PW ethylene-tetrafluorethylene copolymer (EFTE) fabric from NBC Inc. (Liaison Office Europe, Am Isarkanal 21, D-85464 Neufinsing, Germany), which is a 310 μm thick fabric with a mesh opening of 360 μm and an open area of 50% made from 150 μm thick monofilament EFTE, is used in the Comparative Example.

A V C PO 471 PPS fabric from Vandenstorme Weaving (De Bruwaan, Oudenaarde, Belgium), which is a 2.0 mm thick woven fabric with two faces each having a thickness of 300 μm and a hollow channel 1.48 mm thick in between with the woven fabric having an open area of 50% and being made with monofilament 100 μm thick PPS, is used in the Invention Example.

Separators Used in the EXAMPLES:

Two types of separator were used a single layer 550 μm thick reinforced Zirfon® Perl 550 HP single-layer membrane separator produced as described in WO 2009/147084A1 by casting a dope containing as solid constituents 85% by weight of zirconia ($ZrO_2$) and 15% by weight of polysulfone (PSf) from Udel on a FC 0360/50 PW ethylene-tetrafluoroethylene copolymer (EFTE) fabric followed by phase inversion of the dope in N-ethylpyrrolidone (NEP), an organic non-solvent; and a 2.0 mm thick e-by-pass separator consisting of two separator elements sandwiching a contiguous non-separable substantially hollow by-pass channel according to the present invention produced by coating the external faces of a V C PO 471 PPS fabric with a dope containing 85% by weight of zirconia ($ZrO_2$) and 15% by weight of polysulfone (PSf) from Udel leaving a 1.48 mm high free central channel followed by phase inversion of the dope in M-ethylpyrrolidone (NEP), an organic non-solvent.

Figure 10:
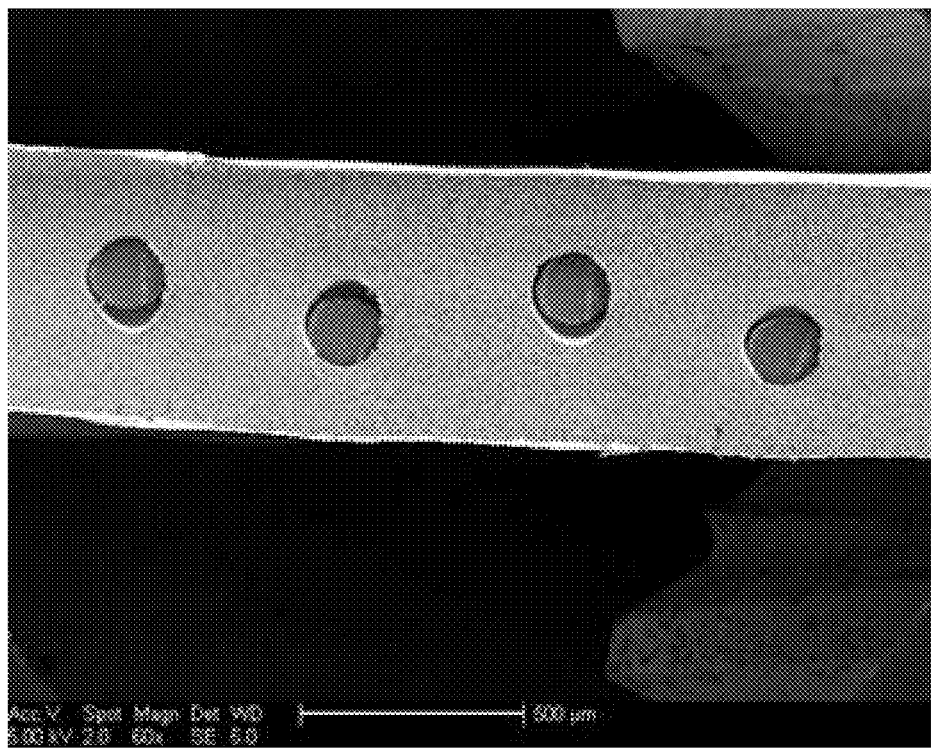
FIG. 10 shows a cross-sectional image of a separator prepared according to the teaching of WO 20091147084A1 used in the comparative examples.

Electrolysers Used in the EXAMPLES:

A two compartment cell was used with the Zirfon® Perl 550 HP single-layer membrane separator with an electrode area of 100 cm$^2$ as shown in FIG. 10. FIG. 10 clearly shows a single layer with the four round points being severed filaments of the spacer fabric. In the case of e-by-pass type separator a three compartment cell was used in which the e-by-pass separator was mounted insides a two-piece circular structural ring allowing for inside feeding of freshly degassed electrolyte with the e by-pass separator shown in FIG. 11. The flow through the 1.48 mm high internal channel of the e-by-pass separator was carried out with a positive displacement pump.

Positive displacement pumps, unlike centrifugal or rotodynamic pumps, in theory produce the same flow at a given speed (RPM) no matter what the discharge pressure. Thus, positive displacement pumps are "constant flow machines". However due to a slight increase in internal leakage as the pressure increases, a truly constant flow rate cannot be achieved.

A positive displacement pump must not be operated against a closed valve on the discharge side of the pump, because it has no shut-off head like centrifugal pumps. A positive displacement pump operating against a closed discharge valve will continue to produce flow and the pressure in the discharge line will increase, until the line bursts or the pump is severely damaged, or both.

Experiments

The experiments were carried out at a temperature between 75 and 85° C. and during the experiments the current density was varied between 1 kA/m² (0.1 A/cm²) and 10 kA/m² (1 A/cm²) and the pressure varied between 30 and 250 bar (3 and 25 MPa).

Two types of experiments were performed on the two- and the three-compartment electrolysers with a Zirfon® Perl 550 HTP separator and the e-pass-separator respectively. The first type of experiments was directed to evaluating the potential of the e-by-pass separator in the three compartment cell configuration for widening the operational range of the electrolyser and the second type of experiments for seeing if the gas purity could be improved with it.

Experiments Directed to Evaluate the Potential for Widening the Operational Range of the Electrolyser:

These experiments were performed at a fixed temperature of 85° C. and a fixed pressure of 30 bar (3 MPa) while varying the current density with 6M KOH as the electrolyte.

The results are summarised in Table 1 for the Zirfon Perl 550 HTP separator and Table 2 for the e-by-pass separator. Table 1 shows that when the normal Zirfon Perl 550 HTP separator was used in the two compartment cell it was found that the hydrogen concentration in the oxygen was high at current densities below 2 kA/m², but at current densities at and above 3 kA/m² they were reduced to about 0.5 volume %. Table 2 shows that when the e-by-pass separator was used in the three compartment cell with a flow rate of electrolyte through the internal channel of the separator of 75 L/hm² [0.021 L/s.m²], it was possible at current densities up to at least 10 kA/m² to prepare high quality oxygen and hydrogen both with an impurity of the other gas of less than 0.05 volume %. However, if the flow rate of electrolyte through the internal channel of the separator was reduced to lower values the concentration of the other gas increased representing a decrease in gas quality. Depending on the flow rate the gas quality could be controlled on demand.

TABLE 1

| | Working conditions | | | | Normal operation | |
|---|---|---|---|---|---|---|
| Experiment number | Temperature [° C.] | Current density [kA/m²] | Pressure [MPa] | Electrolyte flow [L/hm²] [0.28 mL/s · m²] | H₂ in oxygen [vol %] | O₂ in hydrogen [vol %] |
| 1 | 85 | 1 | 3.0 | 0 | 1.2 | 0.3 |
| 2 | 85 | 2 | 3.0 | 0 | 0.6 | 0.17 |
| 3 | 85 | 3 | 3.0 | 0 | 0.45 | 0.11 |
| 4 | 85 | 4 | 3.0 | 0 | 0.41 | 0.1 |
| 5 | 85 | 5 | 3.0 | 0 | 0.41 | 0.11 |
| 6 | 85 | 6 | 3.0 | 0 | 0.42 | 0.12 |
| 7 | 85 | 7 | 3.0 | 0 | 0.44 | 013 |
| 8 | 85 | 8 | 3.0 | 0 | 0.48 | 0.15 |
| 9 | 85 | 9 | 3.0 | 0 | 0.55 | 0.16 |
| 10 | 85 | 10 | 3.0 | 0 | 0.58 | 0.18 |

TABLE 2

| | Working conditions | | | | Operation with e-by-pass separator | |
|---|---|---|---|---|---|---|
| Experiment number | Temperature [° C.] | Current density [kA/m²] | Pressure [MPa] | Electrolyte flow [L/hm²] [0.28 mL/s · m²] | H₂ in oxygen [vol %] | O₂ in hydrogen [vol %] |
| 11 | 85 | 1 | 3.0 | 75 | <0.05 | <0.05 |
| 12 | 85 | 2 | 3.0 | 75 | <0.05 | <0.05 |
| 13 | 85 | 3 | 3.0 | 75 | <0.05 | <0.05 |
| 14 | 85 | 4 | 3.0 | 75 | <0.05 | <0.05 |
| 15 | 85 | 5 | 3.0 | 75 | <0.05 | <0.05 |
| 16 | 85 | 6 | 3.0 | 75 | <0.05 | <0.05 |
| 17 | 85 | 7 | 3.0 | 75 | <0.05 | <0.05 |
| 18 | 85 | 8 | 3.0 | 75 | <0.05 | <0.05 |
| 19 | 85 | 9 | 3.0 | 75 | <0.05 | <0.05 |
| 20 | 85 | 10 | 3.0 | 75 | <0.05 | <0.05 |

Experiments Directed to Evaluate the Potential of Improving the Gas Quality at Very High Pressure:

These experiments were performed at a fixed temperature of 75° C. and a fixed current density of 4 kA/m² with varying pressure. The results are summarised in Table 3 for the Zirfon Perl 550 HTP separator and Table 4 for the e-by-pass separator. Table 3 shows that when the normal Zirfon Perl 550 HTP separator was used in the two compartment cell the hydrogen concentration in oxygen sharply increased when the pressure was higher than 50 bar (5 MPa) and at 250 bar (25 MPa) it attained the very unsafe concentration of 3.5 volume %. Table 4 shows that when the e-by-pass separator was used in the three compartment configuration at 250 bar (25 MPa) in combination with a flow rate of electrolyte through the internal channel in the separator of 200 L/hm² [0.055 L/s.m²] high quality oxygen and hydrogen could be obtained, both with an impurity level of the other gas of less than 0.05% volume %. However, when the flow rate of electrolyte through the internal channel was reduced to 75 L/hm² [0.021 L/s.m²] the oxygen concentration in the hydrogen increased to 1.45 volume %. Furthermore, it was found that at lower pressures lower flow rates of electrolyte through the internal channel were necessary to obtain acceptable gas qualities.

TABLE 3

| | Working conditions | | | Normal operations | | |
|---|---|---|---|---|---|---|
| Experiment number | Temperature [° C.] | Current density [kA/m²] | Pressure [MPa] | Electrolyte flow [L/hm²] [0.28 mL/s · m²] | $H_2$ in oxygen [vol %] | $O_2$ in hydrogen [vol %] |
| 21 | 75 | 4 | 5.0 | 0 | 0.45 | 0.12 |
| 22 | 75 | 4 | 10.0 | 0 | 1.5 | 0.15 |
| 23 | 75 | 4 | 17.5 | 0 | 2 | 0.4 |
| 24 | 75 | 4 | 25.0 | 0 | 3.5 | 1.5 |

TABLE 4

| | Working conditions | | | Operation with e-by-pass separator | | |
|---|---|---|---|---|---|---|
| Experiment number | Temperature [° C.] | Current density [kA/m²] | Pressure [MPa] | Electrolyte flow [L/hm²] [0.28 mL/s · m²] | $H_2$ in oxygen [vol %] | $O_2$ in hydrogen [vol %] |
| 25 | 75 | 4 | 5.0 | 75 | <0.05 | <0.05 |
| 26 | 75 | 4 | 5.0 | 200 | <0.05 | <0.05 |
| 27 | 75 | 4 | 10.0 | 75 | 0.8 | <0.05 |
| 28 | 75 | 4 | 10.0 | 200 | <0.05 | <0.05 |
| 29 | 75 | 4 | 17.5 | 75 | 1.05 | 0.11 |
| 30 | 75 | 4 | 17.5 | 200 | <0.05 | <0.05 |
| 31 | 75 | 4 | 25.0 | 75 | 1.45 | 0.15 |
| 32 | 75 | 4 | 25.0 | 200 | <0.05 | <0.05 |

These experiments demonstrate the potency of the separator configuration of the present invention at suppressing either in part or entirely the cross-contamination of gases being m produced at a cathode with that being produced at the anode and vice versa.

KEY TO SYMBOLS USED IN THE FIGURES

1=completely degassed catholyte
2=cathode end-plate
3=perforated pre-electrode
4=perforated pre-electrode
5=anode end-plate
6=completely degassed anolyte
7=electrolyte circulation pump
8=electrolyte filter
9=water feed-pump
10=partially degassed catholyte
11=partially degassed anolyte
12=anolyte circulation pump
13=catholyte circulation pump
14=Perforated pre-electrode on bipolar plate (Anode side)
15=Perforated pre-electrode on bipolar plate (Cathode side)
16=First electrolyte circulation circuit (Anode side)
17=Second electrolyte circulation circuit (Cathode side)
18=Third electrolyte circulation circuit (From inside of separator)
19=e-by-pass separator
A=anode
C=cathode
CV=brine flow control valve
D=diaphragm
HS=hydrogen separator
Cl-S=chlorine separator
MP=mixing point of catholyte and anolyte
OS=oxygen separator
P1=electrolyte circulation pump 1
P2=electrolyte circulation pump 2
P3=saturated brine feed pump
S1=separator element 1
S2=separator element 2

The invention claimed is:

1. An electrochemical cell, comprising an anodic compartment, a cathodic compartment and a barrier compartment positioned between the cathodic and anodic compartment,
    wherein the barrier compartment comprises an ion permeable reinforced separator, said ion permeable reinforced separator comprising at least one first dope-impregnated membrane and at least one second dope-impregnated membrane, said first membrane positioned adjacent said cathodic compartment and said second membrane positioned adjacent said anodic compartment and at a distance from the first membrane to provide a hollow bypass channel between the first and second membranes, and wherein said hollow bypass channel is free of dope,
    wherein each of said at least one first and second membranes comprises an elongated porous web, a binder, and a metal oxide or hydroxide dispersed therein,
    wherein each of said at least one first and second membranes has a bubble point of at least 1bar and a back-wash resistance of at least 1bar, and each of said at least one first and second membranes is liquid permeable,
    wherein the resistance to flow of electrolyte through the hollow bypass channel between the first and second membranes is at least a factor of ten lower than the resistance to flow across the first and second membranes,
    wherein a pressure in the hollow bypass channel is higher than a pressure in the anodic compartment and a pressure in the cathodic compartment, so that electrolyte flowing in the hollow bypass chamber also flows across the at least one first membrane and the at least one second membrane into the cathodic compartment and anodic compartment, respectively.

2. The electrochemical cell according to claim 1, wherein the first and second membranes are the same or different.

3. The electrochemical cell according to claim 1, wherein the first and second membranes have a resistance of less than 4 Ω-cm at 30° C. in 6M aqueous potassium hydroxide solution and a back-wash resistance of at least 1 bar.

4. The electrochemical cell according to claim 1, wherein said first and second membranes are reinforced with a reinforcement means selected from the group consisting of a web, a grid, wire mesh and a perforated multiwall plate.

5. The electrochemical cell according to claim 4, wherein said perforated multiwall plate is a laminated or extruded multiwall plate.

6. The electrochemical cell according to claim 1, wherein said first membrane and said second membrane are web-reinforced membranes.

7. The electrochemical cell according to claim 6, wherein said first membrane and said second membrane are web-reinforced membranes configured such that the first and second membranes are spaced apart by a spacer between the first and second membranes or they are tied together and spaced apart at a pressure-independent distance.

8. The electrochemical cell according to claim 1, wherein said membranes have a pore size in the range of 0.05 to 0.50 μm.

9. The electrochemical cell according to claim 1, wherein said hollow by-pass channel is integrated in the ion-permeable reinforced separator.

10. The electrochemical cell according to claim 1, wherein said ion permeable reinforced separator is cylindrical.

11. The electrochemical cell according to claim 1, wherein the first and second membranes and the hollow by-pass channel between said first and second membranes are non-separably linked with one another.

12. An electrochemical cell according to claim 1, configured for the production or consumption of at least one gas.

13. The electrochemical cell according to claim 12, wherein said electrochemical cell is an electrochemical cell configured for the production of at least one chemical compound by means of an electrocatalytic reaction.

14. The electrochemical cell according to claim 13, wherein said at least one chemical compound is a gas.

15. The electrochemical cell according to claim 12, wherein said electrochemical cell is an electrolytic cell.

16. The electrochemical cell according to claim 15, wherein said electrolytic cell is an alkaline water electrolysis cell.

17. The electrochemical cell according to claim 12, wherein said electrochemical cell is a fuel cell.

18. The electrochemical cell according to claim 17, wherein said fuel cell is an alkaline fuel cell.

19. A method for producing hydrogen in an electrochemical cell, wherein the electrochemical cell comprises an anodic compartment, a cathodic compartment and a barrier compartment positioned between the cathodic and anodic compartment,
wherein the barrier compartment comprises an ion permeable reinforced separator, said ion permeable reinforced separator comprising at least one first dope-impregnated membrane and at least one second dope-impregnated membrane, said first membrane positioned adjacent said cathodic compartment and said second membrane positioned adjacent said anodic compartment and at a distance from the first membrane to provide a hollow bypass channel between the first and second membranes, and wherein said hollow bypass channel is free of dope,
wherein each of said at least one first and second membranes comprises an elongated porous web, a binder, and a metal oxide or hydroxide dispersed therein,
wherein each of said at least one first and second membranes has a bubble point of at least 1 bar and a back-wash resistance of at least 1 bar, and each of said at least one first and second membranes is liquid permeable,
wherein the resistance to flow of electrolyte through the hollow bypass channel between the first and second membranes is at least a factor of ten lower than the resistance to flow across the first and second membranes,
wherein a pressure in the hollow bypass channel is higher than a pressure in the anodic compartment and a pressure in the cathodic compartment, so that electrolyte flowing in the hollow bypass chamber also flows across the at least one first membrane and the at least one second membrane into the cathodic compartment and anodic compartment, respectively,
said method comprising conducting an electrocatalytic reaction in the electrochemical cell.

20. A process of producing or consuming at least one gas, comprising conducting an electrocatalytic reaction in an electrochemical cell, wherein the electrochemical cell comprises an anodic compartment, a cathodic compartment and a barrier compartment positioned between the cathodic and anodic compartment,
wherein the barrier compartment comprises an ion permeable reinforced separator, said ion permeable reinforced separator comprising at least one first dope-impregnated membrane and at least one second dope-impregnated membrane, said first membrane positioned adjacent said cathodic compartment and said second membrane positioned adjacent said anodic compartment and at a distance from the first membrane to provide a hollow bypass channel between the first and second membranes, and wherein said hollow bypass channel is free of dope,
wherein each of said at least one first and second membranes comprises an elongated porous web, a binder, and a metal oxide or hydroxide dispersed therein,
wherein each of said at least one first and second membranes has a bubble point of at least 1 bar and a back-wash resistance of at least 1 bar, and each of said at least one first and second membranes is liquid permeable,
wherein the resistance to flow of electrolyte through the hollow bypass channel between the first and second membranes is at least a factor of ten lower than the resistance to flow across the first and second membranes,
wherein a pressure in the hollow bypass channel is higher than a pressure in the anodic compartment and a pressure in the cathodic compartment, so that electrolyte flowing in the hollow bypass chamber also flows across the at least one first membrane and the at least one second membrane into the cathodic compartment and anodic compartment, respectively.

21. The process according to claim 20, wherein said electrochemical cell is a high-pressure electrochemical cell.

22. The process according to claim 20, wherein said electrochemical cell is an electrolytic cell.

23. The process according to claim 22, wherein said electrolytic cell is an alkaline water electrolysis cell.

24. The process according to claim 20, wherein said electrochemical cell is a fuel cell.

25. The process according to claim 24, wherein said fuel cell is an alkaline fuel cell.

* * * * *